(12) United States Patent
Chiang et al.

(10) Patent No.: US 8,617,430 B2
(45) Date of Patent: Dec. 31, 2013

(54) AMORPHOUS AND PARTIALLY AMORPHOUS NANOSCALE ION STORAGE MATERIALS

(75) Inventors: Yet-Ming Chiang, Framingham, MA (US); Anthony E. Pullen, Belmont, MA (US); Nonglak Meethong, Cambridge, MA (US)

(73) Assignee: A123 Systems LLC, Livonia, MI (US)

( * ) Notice: Subject to any disclaimer, the term of this patent is extended or adjusted under 35 U.S.C. 154(b) by 0 days.

(21) Appl. No.: 13/446,694

(22) Filed: Apr. 13, 2012

(65) Prior Publication Data

US 2012/0270109 A1    Oct. 25, 2012

Related U.S. Application Data

(60) Division of application No. 11/607,525, filed on Dec. 1, 2006, now Pat. No. 8,158,090, which is a continuation-in-part of application No. 11/396,515, filed on Apr. 3, 2006, now Pat. No. 7,939,201.

(60) Provisional application No. 60/741,606, filed on Dec. 2, 2005, provisional application No. 60/706,273, filed on Aug. 8, 2005.

(51) Int. Cl.
*C01B 25/00* (2006.01)
*H01M 4/00* (2006.01)

(52) U.S. Cl.
USPC ............. 252/519.1; 252/519.12; 252/519.14; 252/519.15; 429/218.1; 429/231.8; 429/231.95

(58) Field of Classification Search
USPC .......... 429/218.1–231.95; 252/519.1, 519.12, 252/519.13, 519.14, 519.15
See application file for complete search history.

(56) References Cited

U.S. PATENT DOCUMENTS

| | | | |
|---|---|---|---|
| 5,609,975 A | 3/1997 | Hasegawa et al. | |
| 5,705,296 A | 1/1998 | Kamauchi et al. | |
| 5,910,382 A | 6/1999 | Goodenough et al. | |
| 6,156,931 A | 12/2000 | Lewis | |
| 6,322,929 B1 | 11/2001 | Takada et al. | |
| 6,440,606 B1 | 8/2002 | Yoshizawa et al. | |
| 6,514,640 B1 | 2/2003 | Armand et al. | |
| 6,528,033 B1 | 3/2003 | Barker et al. | |
| 6,596,435 B2 | 7/2003 | Kelley | |
| 6,620,550 B2 | 9/2003 | Christian | |
| 6,632,566 B1 * | 10/2003 | Yamada et al. | 429/218.1 |
| 6,656,635 B2 | 12/2003 | Okawa et al. | |
| 6,702,961 B2 | 3/2004 | Barker | |
| 6,716,372 B2 | 4/2004 | Barker | |
| 6,730,281 B2 | 5/2004 | Barker | |
| 6,749,967 B2 | 6/2004 | Li et al. | |
| 6,753,112 B2 | 6/2004 | Ooya | |
| 6,835,500 B2 | 12/2004 | Masquelier | |
| 6,960,331 B2 | 11/2005 | Barker et al. | |
| 7,025,907 B2 | 4/2006 | Kohzaki | |
| 7,282,301 B2 | 10/2007 | Wixom et al. | |
| 7,338,734 B2 | 3/2008 | Chiang et al. | |
| 7,390,473 B1 * | 6/2008 | Singhal et al. | 423/306 |
| 7,514,181 B2 | 4/2009 | Ugaji et al. | |
| 7,939,201 B2 | 5/2011 | Chiang et al. | |
| 8,057,936 B2 | 11/2011 | Chiang et al. | |
| 8,158,090 B2 | 4/2012 | Chiang et al. | |
| 2001/0016284 A1 | 8/2001 | Kweon | |
| 2002/0041998 A1 | 4/2002 | Hosoya | |
| 2002/0047112 A1 | 4/2002 | Hosoya | |
| 2002/0059719 A1 | 5/2002 | Hosoya | |
| 2002/0061274 A1 | 5/2002 | Hosoya | |
| 2002/0086214 A1 | 7/2002 | Barker | |
| 2002/0094481 A1 | 7/2002 | Goto et al. | |
| 2002/0102459 A1 | 8/2002 | Hosoya | |
| 2002/0106563 A1 | 8/2002 | Okawa et al. | |
| 2002/0110736 A1 | 8/2002 | Kweon et al. | |
| 2002/0114754 A1 | 8/2002 | Hosoya | |
| 2002/0124386 A1 | 9/2002 | Hosoya | |
| 2002/0182497 A1 | 12/2002 | Kohzaki et al. | |
| 2002/0192137 A1 | 12/2002 | Chaloner-Gill et al. | |
| 2002/0195591 A1 | 12/2002 | Ravet et al. | |
| 2003/0129492 A1 | 7/2003 | Barker et al. | |
| 2004/0002003 A1 | 1/2004 | Yamada et al. | |

(Continued)

FOREIGN PATENT DOCUMENTS

| | | |
|---|---|---|
| CN | 1350342 A | 5/2002 |
| CN | 1549366 A | 11/2004 |

(Continued)

OTHER PUBLICATIONS

Allen et al. "$LI_{1+x}FE_{1+x}PO_4$: Electronically Conductive Lithium Iron PhosphoOolivines with Improved Electrochemical Performance." *The Proceedings of the Electromechanical Society, 204th Meeting* Orlando, Florida Oct. 12-16, 2003, Abs. 347 (pre-print), 8 pages.
Amine et al. "High-temperature storage and cycling of $C-LiFePO_4$/graphite Li-ion cells," *Electrochemical Comm.* 7:669-672 (2005).
Andersson, et al., "The Source of First-Cycle Capacity Loss in $LiFePO_4$", Journal of Power Sources, 97-98: 498-502 (2001).
Chen et al. "Reducing Carbon in $LiFePO_4$/C Composite Electrodes to Maximize Specific Energy, Volumetric Energy, and Tap Density." *Journal of the Electromechanical Society*, 149(9) A1184-A1189 (2002).
Chiang et al. Abstract for "Physical Properties of Cation-Doped Nanoscale Lithium Iron Phosphate." Department of Materials Science and Enginnering, Massachusetts Institute of Technology. 1 Page. No Date Listed.
Chiang et al., "Characterization of Grain Boundary Segregation in MgO," J. Am. Ceram. Soc., 64:383-89 (1981).
Chiang et al., "Defect and Transport Properties of Nanocrystalline $CeO_{2-x}$," Applied Phys. Lett., 69:185-187 (1996).

(Continued)

*Primary Examiner* — Steven Bos
(74) *Attorney, Agent, or Firm* — Wilmer Cutler Pickering Hale and Dorr LLP

(57) ABSTRACT

Amorphous or partially amorphous nanoscale ion storage materials are provided. For example, lithium transition metal phosphate storage compounds are nanoscale and amorphous or partially amorphous in an as-prepared state, or become amorphous or partially amorphous upon electrochemical intercalation or de-intercalation by lithium. These nanoscale ion storage materials are useful for producing devices such as high energy and high power storage batteries.

18 Claims, 24 Drawing Sheets

(56) References Cited

U.S. PATENT DOCUMENTS

| | | |
|---|---|---|
| 2004/0005265 A1 | 1/2004 | Chiang et al. |
| 2004/0175614 A1 | 9/2004 | Wurm |
| 2005/0003274 A1 | 1/2005 | Armand et al. |
| 2005/0175525 A1 | 8/2005 | Fu et al. |
| 2005/0233220 A1 | 10/2005 | Gozdz et al. |
| 2006/0194113 A1 | 8/2006 | Okada et al. |
| 2007/0031732 A1 | 2/2007 | Chiang et al. |
| 2007/0152185 A1* | 7/2007 | Gauthier et al. ........... 252/182.1 |
| 2007/0190418 A1 | 8/2007 | Chiang et al. |
| 2007/0292747 A1 | 12/2007 | Chiang et al. |
| 2011/0195306 A1 | 8/2011 | Chiang et al. |

FOREIGN PATENT DOCUMENTS

| | | | |
|---|---|---|---|
| CN | 1571195 | A | 1/2005 |
| FR | 2865576 | * | 7/2005 |
| JP | 62271370 | | 11/1987 |
| JP | 01-250555 | | 10/1989 |
| JP | 3246868 | A | 11/1991 |
| JP | 05-283075 | | 10/1993 |
| JP | 06-283207 | | 10/1994 |
| JP | 01-307730 | | 11/2001 |
| JP | 02-075356 | | 3/2002 |
| JP | 2005060181 | A | 3/2005 |
| TW | 200642134 | | 12/2006 |
| WO | WO-9904441 | A1 | 1/1999 |
| WO | WO-0060680 | A1 | 10/2000 |
| WO | WO-0289233 | A2 | 11/2002 |
| WO | WO-03056646 | A1 | 7/2003 |
| WO | WO-03085757 | A1 | 10/2003 |
| WO | WO-2005041327 | A1 | 5/2005 |
| WO | WO-2005051840 | | 6/2005 |
| WO | WO-2006046085 | | 5/2006 |
| WO | WO-2007000251 | | 1/2007 |
| WO | WO-2008102270 | | 8/2008 |
| WO | WO-2008102271 | | 8/2008 |

OTHER PUBLICATIONS

Chiang et al., "Nonstoichiometry and Electrical Conductivity of Nanocrystalline $CeO_{2-x}$," *Journal of Electroceramics*, 1:7-14 (1997).

Chiang et al., Physical Ceramics: Principles for Ceramic Science and Engineering, Chapter 3, John Wiley & Sons (1997), 77 pages.

Chiang, "Introduction and Overview: Physical Properties of Nanostructured Materials," J. Electroceramics, 1:205-209 (1997).

Chung et al. "Electronically conductive phospho-olivines as lithium storage electrodes". Nature Materials Online Publication. Sep. 22, 2002. (1-6).

Chung et al. "Electronically Conductive Phospho-Olivines as Lithium Storage Electrodes." *Nature Materials*. vol. 1, Oct. 2002, 123-128, 6 pages.

Chung, "Correspondence: From Our Readers", Nature Materials, 2:702-703 (2003) (2 pages).

Delacourt et al., "The existence of a temperature-driven solid solution in $Li_xFePO_4$ for $0 \le x^3 1$," Nature Materials, 4:254-260 (2005).

Delacourt et al., "Two-phase vs. one-phase Li+ extraction/insertion mechanisms in olivine-type materials," Abstract 200, 207th Meeting of The Electrochemical Society, Quebec City, CA, May 15-20, 2005, 1 page.

Dodd et al., Electrochemical Solid State Lett. 9:A151-A155 (2006).

European Search Report for European Patent Application No. 06844738.2 mailed Nov. 16, 2010. 6 pages.

European Search Report for European Patent Application No. 06851633.5 mailed Nov. 11, 2010. 6 pages.

Goodenough et al. "Cathodes for Lithium-Ion Batteries: Some Comparisons." Denki Kagaku. vol. 66, No. 12. 1998. Electrochemical Society of Japan. pp. 1173-1181.

Huang et al. "Approaching Theoretical Capacity of $LiFePO_4$ at Room Temperature at High Rates," *Electrochemical Solid State Lett.* 4:A170-A172 (2001).

Ikeda et al., "Space Charge Segregation at Grain Boundaries in Titanium Dioxide: Part I, Relationship Between Lattice Defect Chemistry and Space Charge Potential," J. Am. Ceram. Soc., 76:2437-2446 (1993).

Ikeda et al., "Space Charge Segregation at Grain Boundaries in Titanium Dioxide: Part II, Model Experiments," J. Am. Ceram. Soc., 76:2447-2459 (1993).

International Search Report and Written Opinion, International Patent Application No. PCT/US06/30579, mailed Sep. 16, 2008 (12 pages).

International Search Report and Written Opinion, International Patent Application No. PCT/US08/52584, mailed Oct. 1, 2008 (8 pages).

International Search Report issued for PCT/US2009/031552, dated Sep. 1, 2009, 4 pages.

International Search Report, corresponding to International Application No. PCT/US06/46085, mailed Feb. 26, 2008 (4 pgs).

Li et al. "Optimized $LiMn_yFe_{1-y}PO_4$ as the Cathode for Lithium Batteries" *Journal of the Electrochemical Society* 149:A743-A747 (2002).

Lourenco, A. et al. "Electrochemical and optical characterization of RF-sputtered thin films of vanadium-nickel mixed oxides" Electrochimica Acta 46 (2001) 2257-2262.

Meethong et al. "Electronically Induced Phase Transformation in Nanscale Olivines LiMPO (M=Fe, Mn)" *Chemistry of Materials*. 2008, 20, 6189-6198. 11 pages.

Meethong et al. "Strain Accommodation During Phase Transformations in Olivine-Based Cathodes as a Materials Selection Criterion for High-Power Rechargable Batteries." *Advanced Functional Materials*. 2007, 17, 1115-1123. 9 pages.

Meethong et al., "Strain accommodation during phase transformations in olivine-based cathodes as a materials selection criterion for high-power rechargeable batters," *Adv. Functional Mater., In press* 2006, 9 pages.

Meethong, et al., "Size-Dependent Lithium Miscibility Gap in Nanoscale $Li_{1-x}FePO_4$", Electrochemical and Solid State Letters, 10(5):A134-A138 (2007) (5 pages).

Notification of the Third Office Action for CN 200880009462.2 mailed Jul. 20, 2012. 7 pages.

Office Action for U.S. Appl. No. 11/396,515 mailed Feb. 17, 2011. 19 pages.

Office Action for U.S. Appl. No. 11/396,515 mailed Jul. 21, 2010. 22 pages.

Office Action for U.S. Appl. No. 11/396,515 mailed Nov. 4, 2009. 22 pages.

Office Action for U.S. Appl. No. 11/607,525 mailed Jul. 14, 2010. 11 pages.

Office Action for U.S. Appl. No. 11/607,525 mailed Jun. 9, 2011. 15 pages.

Office Action for U.S. Appl. No. 11/607,525 mailed Oct. 27, 2009. 12 pages.

Office Action for U.S. Appl. No. 11/672,931, mailed Mar. 25, 2011, for U.S. Application. 8 pages.

Ong, T.S. and Yang, H. "Symmetrical Cell for Electrochemical AC Impedance Studies of Lithium Intercalation into Graphite." Electrochemical and Solid-State Letters, 4(7) A89-A92 (2001).

Prosini et al. "A New Synthetic Route for Preparing $LiFePO_4$ with Enhanced Electromechanical Performance," *J. Electrochem. Soc.*, 149: A886-A890 (2002).

Shim et al. "The development of low cost LiFePO4-based high power lithium-ion batteries." eScholarship Repository, University of California, 2003. Paper LBNL54098 (8 Pages).

Srinivasan, et al., "Discharge Model for the Lithium Ion-Phosphate Electrode", Journal of the Electrochemical Society, 151:A1517-A1529 (2004).

Teja, Amyn et al. Continuous hydrothermal synthesis of inorganic nanoparticles (including battery electrode materials). *NanoMaterials for Energy Applications*. Georgia Tech School of Chemical and Biomolecular Engineering. (http://www.che.gatech.edu/research/areas/nanotechnology/energy.php), Accessed Dec. 11, 2008, 2 pages.

Yamada et al. "Phase Diagram of $Li_x (Mn_yFe_{1-y})PO_4$ ($0 \le x$, $y \le 1$)" *Journal of the Electromechanical Society*, 148(10) A1153-A1158 (2001).

Yamada et al., "Phase Change in $Li_xFePO_4$", Electrochemical and Solid State Letters, 8:A409-A413 (2005).

(56) References Cited

OTHER PUBLICATIONS

Yang et al., "Reactivity, Stability, and Electrochemical Behavior of Lithium Iron Phosphates", *Electrochemical Communication*, 4:239-244 (2002).

Zhang et al. "Nanostructured $LiMn_2O_4$ prepared by a glycine-nitrate process for lithium-ion betteries" *Solid State Ionics* 171 (2004) 25-31.

Zhou et al. The electronic structure and band gap of $LiFePO_4$; *Solid State Communications* 132 (2004) pp. 181-186.

\* cited by examiner

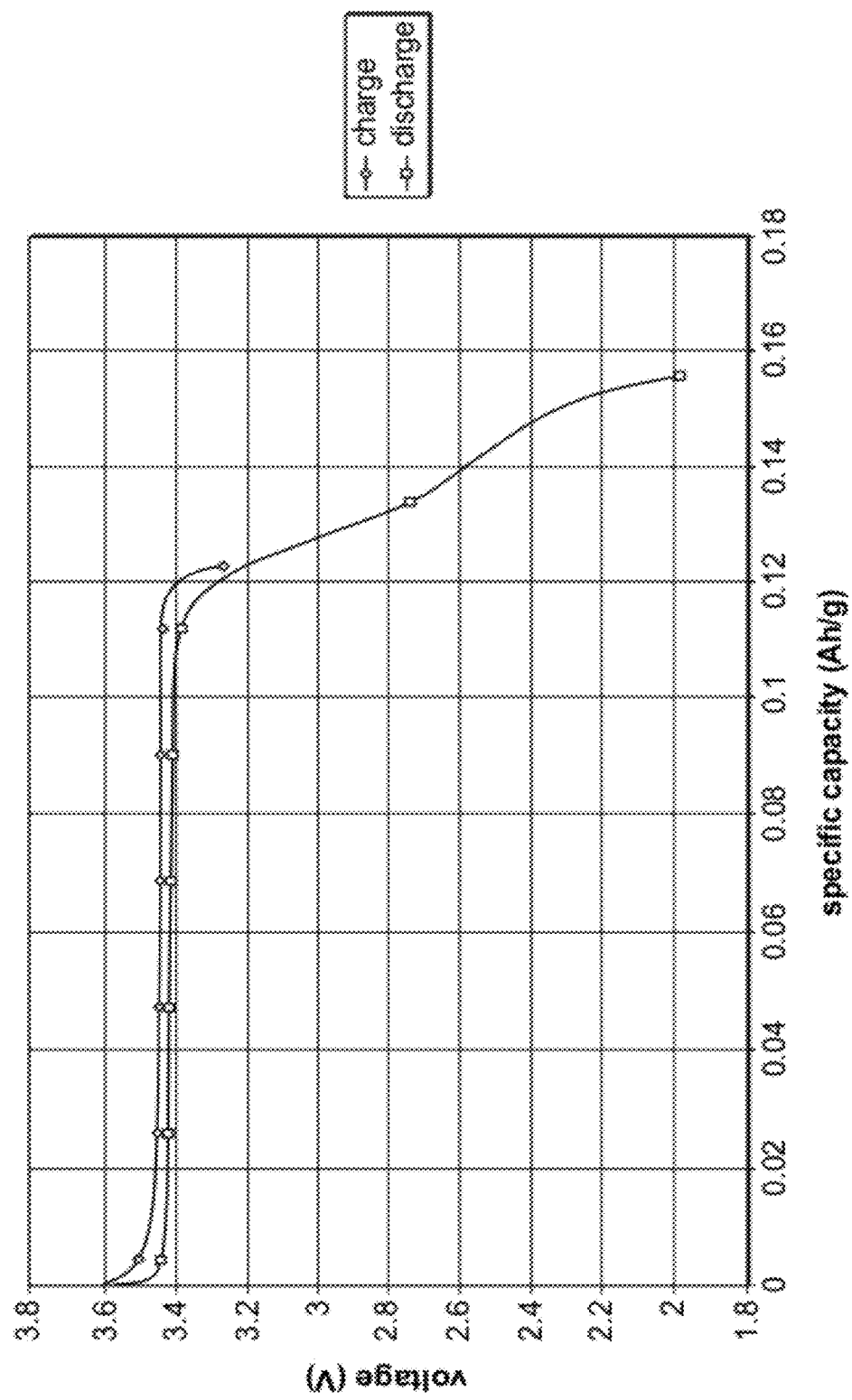

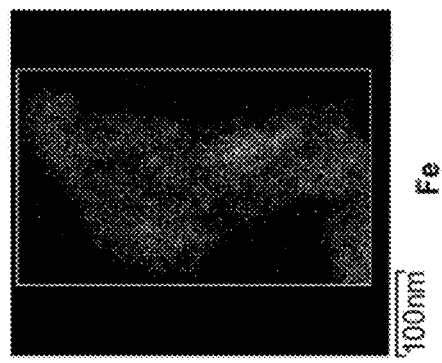
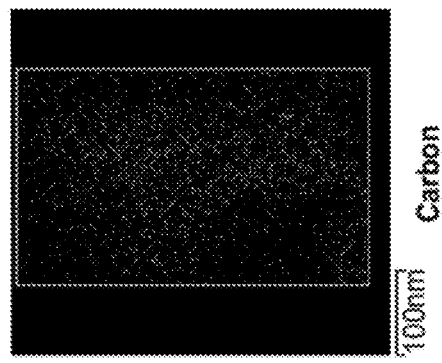
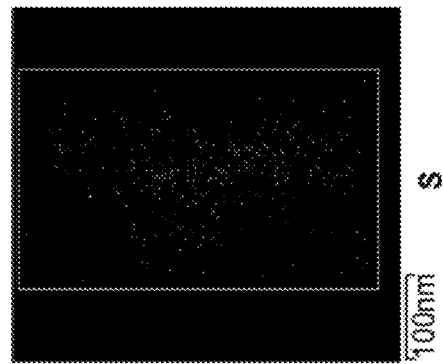
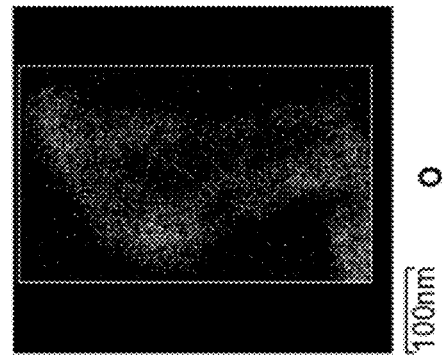
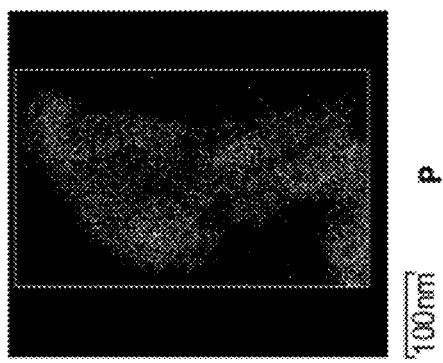

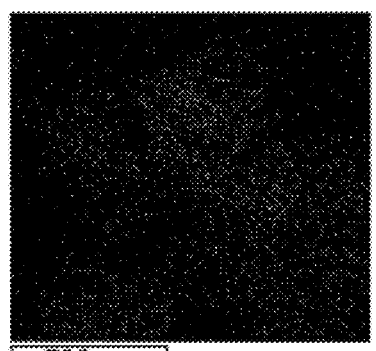
FIG. 9A Carbon
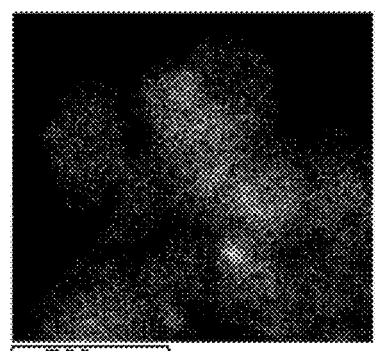
FIG. 9B Fe
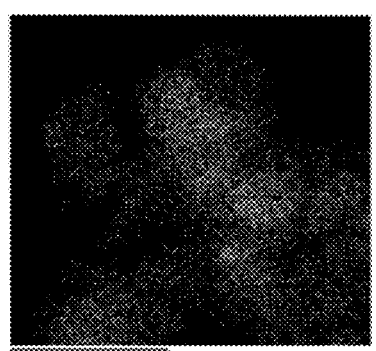
FIG. 9C P
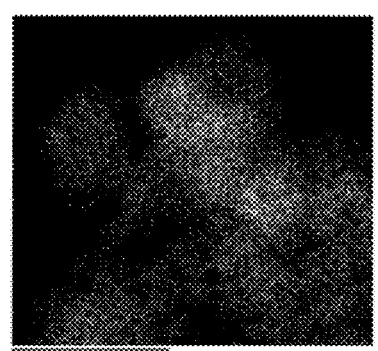
FIG. 9D O

AMORPHOUS AND PARTIALLY AMORPHOUS NANOSCALE ION STORAGE MATERIALS

RELATED APPLICATIONS

This application is a divisional of U.S. patent application Ser. No. 11/607,525, filed Dec. 1, 2006, which is a continuation-in-part of U.S. patent application Ser. No. 11/396,515, filed Apr. 3, 2006, now U.S. Pat. No. 7,939,201, which claims priority to U.S. Provisional Application No. 60/706,273, filed Aug. 8, 2005, and also claims priority to U.S. Provisional Application No. 60/741,606, filed Dec. 2, 2005. The contents of all of these priority applications are incorporated herein by reference.

BACKGROUND

1. Field

The field includes ion storage materials, and in particular nanoscale ion storage materials useful in devices such as batteries.

2. Summary of Related Art

Ion storage materials are widely employed in storage batteries and other electrochemical devices. Various ion storage materials are known, including alkaline transition metal phosphates. This class of compounds can crystallize in a number of structure types. Examples include ordered or partially disordered structures of the olivine ($A_xMXO_4$), NASICON ($A_x(M',M'')_2(XO_4)_3$), $VOPO_4$, $LiVPO_4F$, $LiFe(P_2O_7)$ or $Fe_4(P_2O_7)_3$ structure types, wherein A is an alkali ion, and M, M' and M'' are metals. Amorphous $FePO_4$ materials, prepared in the delithiated state, also have been used as lithium storage materials (Okada et al., Patent Abstracts of Japan Publication No. 06-283207). Amorphous materials including lithium cobalt phosphate also have been described (U.S. Pat. No. 5,705,296).

Many of the above ion storage compounds have relatively low electronic conductivity and alkali ion conductivity, which are less than ideal for electrochemical applications. Many such compounds also exhibit limited solid solution range. For example, $LiFePO_4$ has been widely reported in the scientific literature to have an extremely limited range of solid solution at room temperature.

"Nanocrystalline" ion storage materials have been reported in the literature. For example, Prosini et al. in "A New Synthetic Route for Preparing $LiFePO_4$ with Enhanced Electrochemical Performance," *J. Electrochem. Soc.*, 149: A886-A890 (2002), describe $LiFePO_4$ of 8.95 $m^2/g$ specific surface area as nanocrystalline. However, these materials, while somewhat improved, have not been of sufficiently small size scale to provide substantially different properties compared to their larger scale counterpart conventional ion storage materials. Further nanoscale particulate phosphate materials also have been disclosed (US 2002/0192137).

Lithium transition metal phosphate storage compounds useful in high energy, high power batteries are described in U.S. Patent Application Publication No. US2004/0005265, entitled "Conductive Lithium Storage Electrode," and U.S. patent application Ser. No. 11/396,515, entitled "Nanoscale Ion Storage Materials," now U.S. Pat. No. 7,939,201, the disclosures of which are incorporated herein by reference.

SUMMARY

It now has been discovered unexpectedly that certain nanoscale lithium transition metal phosphate storage compounds (for example, certain compounds having chemical compositions as disclosed in US2004/0005265 or U.S. patent application Ser. No. 11/396,515, now U.S. Pat. No. 7,939, 201), when formulated using processing methods, particle sizes, and/or compositional ranges as described herein, can be prepared in amorphous or partially crystalline/partially amorphous form. It also has been discovered that certain such materials can be rendered disordered or amorphous upon electrochemical intercalation or de-intercalation by lithium, thereby conferring certain benefits, for example, when used as lithium storage electrodes. Accordingly, disclosed herein are novel amorphous and partially amorphous nanoscale ion storage materials, and methods of preparing the same. The nanoscale ion storage materials are useful for producing devices such as high energy and high power storage batteries, battery-capacitor hybrid devices, and high rate electrochromic devices.

One aspect provides a predominantly crystalline nanoscale lithium transition metal phosphate material having a specific surface area of at least about 10 $m^2/g$, for example, at least about 25 $m^2/g$, or at least about 50 $m^2/g$. The amorphous content of the material increases upon delithiation and/or lithiation. In some embodiments, the material has a primary particle size with an average smallest cross-sectional dimension of about 200 nm or less, in some instances about 100 nm or less.

In certain embodiments, the lithium transition metal phosphate material has an overall composition of $Li_{1-a}N_bM_c(XO_4)_d$, wherein M is at least one first row transition metal selected from the group consisting of Ti, V, Cr, Mn, Fe, Co and Ni; N is an element from Groups IIA, IIIA, IVA, VA, VIA, IIB, IIIB or VIIB of the periodic table; X is one or more of P, Si, Ge, As and S; $0 \leq a \leq 1$; $0 \leq b \leq 0.10$; $0.8 \leq c \leq 1.2$; and $0.9 \leq d \leq 2.2$. In some embodiments, M is Fe, or M includes Mn and Fe.

In some embodiments, the lithium transition metal phosphate material has an overall composition of $Li_{1-x}MPO_4$, wherein M is at least one first row transition metal selected from the group consisting of Ti, V, Cr, Mn, Fe, Co and Ni, and wherein in use x ranges between 0 and 1. In certain embodiments, M is Fe, or M includes Mn and Fe. In certain embodiments, x in the as-prepared material is at least about 0.05, or at least about 0.15. In some embodiments, N is Nb and $0<b\leq0.10$. In certain embodiments, the as-prepared composition contains lithium at a concentration of at least about 5% by mole, or at least about 10% by mole, relative to the transition metal concentration.

In certain embodiments, the lithium transition metal phosphate material is included in a cathode, which can be used in an electrochemical cell.

Another aspect provides a method of increasing the amorphous content of a predominantly crystalline nanoscale lithium transition metal phosphate material. The method includes lithiating and/or delithiating the material. The material has a specific surface area of at least about 10 $m^2/g$. In certain embodiments, lithiating and/or delithiating the predominantly crystalline nanoscale lithium transition metal phosphate material is achieved by incorporating the material into the cathode of a storage battery and charging and/or discharging the battery.

Still another aspect provides a compound having the formula $Li_aC_bM_cN_dX_eO_f$, wherein M is one or more first-row transition metals; N is an element from Groups IIA, IIIA, IVA, VA, VIA, IIB, IIIB or VIIB of the periodic table; X is one or more of P, Si, Ge, As, S; $0 \leq a \leq 1$; $0.001 \leq b \leq 0.10$; $0.8 \leq c \leq 1.2$; $0 \leq d \leq 0.10$; $0.9 \leq e \leq 2.2$; and $3.6 \leq f \leq 8.8$. In certain embodiments, M includes at least one first row transition metal selected from the group consisting of Ti, V, Cr, Mn, Fe, Co and Ni. For example, M is Fe, or M includes Mn and Fe. In certain embodiments, N is Nb and $0 < d \leq 0.10$. In certain embodiments, X is P. In some embodiments, the as-prepared composition contains lithium at a concentration of at least about 5%, or at least about 10%, by mole relative to the transition metal concentration. In some embodiments, the as-prepared composition contains lithium at a concentration of no more than about 95%, in some instances no more than about 85%, by mole relative to the transition metal concentration.

In certain embodiments, the compound is at least partially amorphous. In certain embodiments, the compound has a specific surface area of at least about 10 m$^2$/g, at least about 25 m$^2$/g, or at least about 50 m$^2$/g. In certain embodiments, the compound has a primary particle size with an average smallest cross-sectional dimension of about 200 nm or less, or about 100 nm or less. In certain embodiments, the compound is included in a cathode, which can be used in an electrochemical cell.

Another aspect provides an amorphous nanoscale lithium transition metal phosphate material containing carbon at a concentration between about 0.1% and about 10% by mole relative to the transition metal concentration, and including an electrochemically active, amorphous Li—M—P—O—C phase, where M is one or more first row transition metals.

BRIEF DESCRIPTION OF THE DRAWINGS

The following figures are presented for the purpose of illustration only, and are not intended to be limiting.

FIGS. 7A, B, C, D and E show, respectively, C, Fe, P, O and S elemental maps for the sample from FIG. 6.

FIGS. 9A, B, C and D show, respectively, C, Fe, P and O elemental maps for the sample from FIG. 8.

FIG. 15B shows the Si diffraction peak at 28.5°, which can be used to calibrate the peaks from the sample.

DETAILED DESCRIPTION

Figure 1:
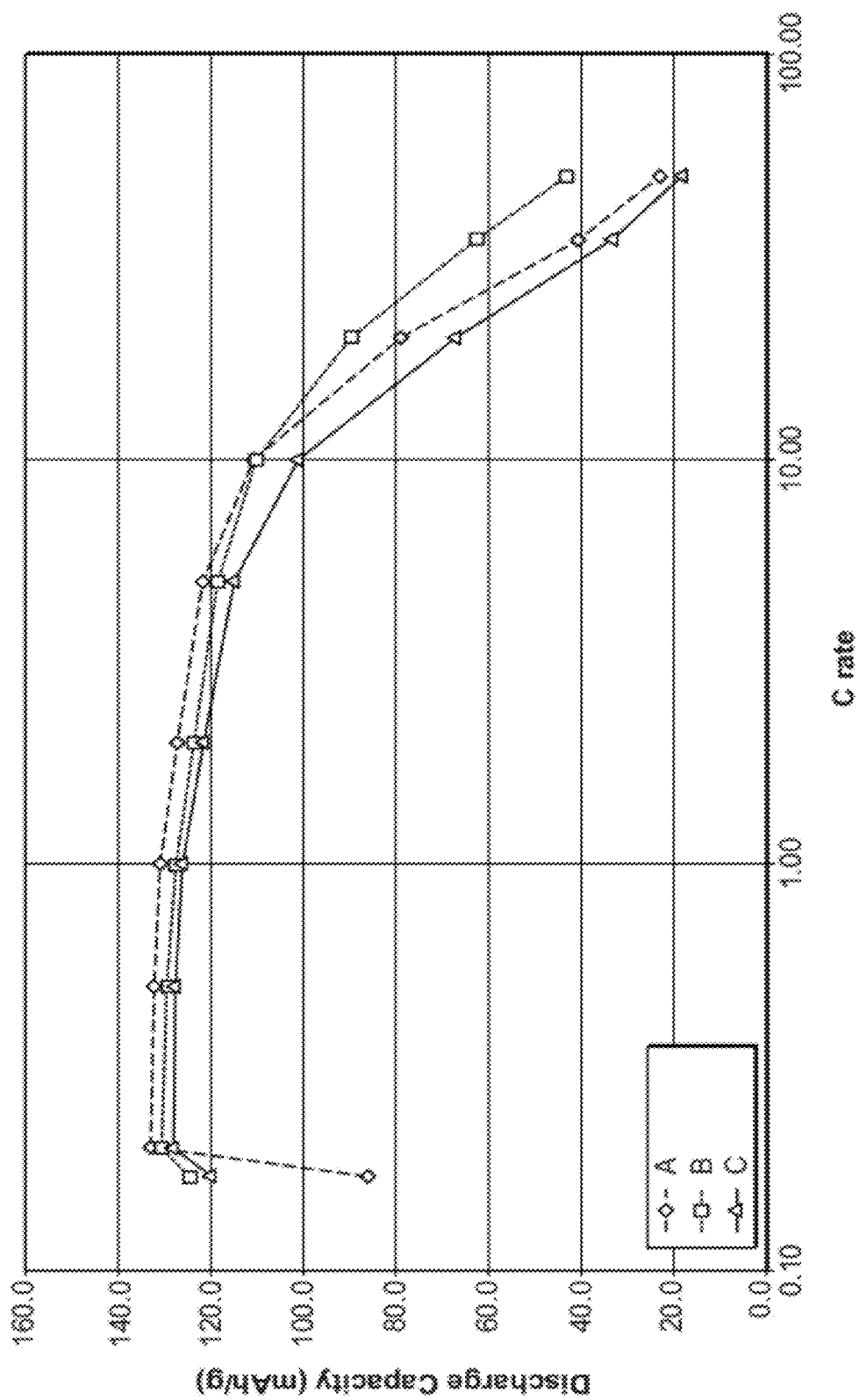
FIG. 1 is a plot of discharge capacity at various C-rates for Swagelok™ type lithium half-cells made from powders of nanoscale Li$_{0.9}$FePO$_4$ (sample A), Li$_{1.0}$FePO$_4$ (sample B), and Li$_{0.95}$FePO$_4$ (sample C), which had carbon contents of 5.43%, 4.90% and 4.63%, respectively.

Disclosed herein are novel amorphous nanoscale ion storage materials and methods of preparing the same. This disclosure is based on the unexpected discovery that certain nanoscale lithium transition metal phosphate storage compounds (for example, certain compounds having chemical compositions as disclosed in US2004/0005265 and U.S. patent application Ser. No. 11/396,515, now U.S. Pat. No. 7,939,201), when formulated using processing methods, particle sizes, and/or compositional ranges as described herein, can be prepared in amorphous or partially crystalline/partially amorphous form. The present disclosure is based on the further unexpected discovery that certain such materials (initially in a crystalline form) can be rendered disordered or amorphous upon electrochemical intercalation or de-intercalation by lithium, thereby conferring certain benefits, for example, when used as lithium storage electrodes.

Previously, experiments were conducted in which nanoscale LiFePO$_4$ was synthesized and shown by electrochemical testing to have outstanding capacity and rate capability. It was recognized, based on lithium half-cell tests, that these materials possessed lower first-charge capacity than first-discharge or subsequent discharge capacity, showing that the as-synthesized material had the ability to form a lithium-deficient solid solution, in contradiction to the commonly held belief that pure LiFePO$_4$ cannot tolerate nonstoichiometry in solid solution. GITT experiments were conducted further confirming these results, by showing that there is an equilibrium potential towards the end of discharge that is lower than the flat "two-phase" potential and that exists over a substantial range of capacity. These results were included in U.S. patent application Ser. No. 11/396,515, now U.S. Pat. No. 7,939,201, and are incorporated herein by reference. It was there discussed that the formation of nanoscale materials could result in defect properties and phases that do not form at larger size scales. In particular, the differences in physical properties and structure between the nanoscale and conventional crystalline states can be likened to the difference between the crystalline and glassy forms of a single composition, which have such clearly different thermodynamic, structural and physical properties as to be considered different materials.

Here it is documented that certain nanoscale lithium transition metal phosphates (including certain doped phosphates having a composition as disclosed in US2004/0005265, lithium-deficient compositions or undoped phosphates as described in U.S. patent application Ser. No. 11/396,515, now U.S. Pat. No. 7,939,201), when formulated using processing methods, particle sizes, and/or compositional ranges as described herein, can be made in a glassy (amorphous) structural state, or a partly amorphous and partly crystalline state. "Amorphous" refers to materials that are lacking in long-range atomic periodicity, as is commonly known to those skilled in the art of materials science, chemistry, or solid-state physics. The periodicity of solids is measurable using diffraction methods, for example, X-ray or neutron or electron diffraction. One measure of whether a material is crystalline or amorphous is the nature of the diffraction pattern. In such spectra, a crystalline material exhibits increased diffracted intensity above background at diffraction angles satisfying Bragg's law. Thus a crystalline compound exhibits a diffraction pattern, the peak positions and intensities of which can be measured or computed from atomic positions by methods well-known to those skilled in the art. In one well-known method, Rietveld refinement, the determination that a material is crystalline is arrived at when the experimental diffraction pattern can be modeled to an acceptable "goodness of fit" by assuming a particular crystal structure of infinite extent and including additional structural parameters to account for the thermal vibration amplitude, small crystallite size, or differential strain within the crystal. In contrast, an amorphous material does not exhibit the characteristic diffraction peaks corresponding to a long-range periodic arrangement of atoms, and may exhibit broad diffracted intensity over a wide range of diffraction angle, corresponding to a short-range periodicity of the material. It is also possible for crystalline phases to exhibit varying degrees of atomic disorder. Such disordered materials may have diffraction spectra with broadened peaks and unexpected integrated peak intensities compared to a substantially perfectly ordered crystal, and are included amongst the "partially amorphous" or "disordered" materials of the invention.

A "partially amorphous" material may have at least about 5% amorphous phase by mass or volume of the active phase. Partially amorphous materials may include at least about 10%, or at least about 20% by mass or volume of the active phase. Higher amorphous loads are also contemplated.

In certain embodiments, amorphous or partially amorphous nanoscale ion storage materials are provided having the formula $Li_{1-a}N_bM_c(XO_4)_d$, where M comprises at least one first row transition metal selected from the group consisting of Ti, V, Cr, Mn, Fe, Co and Ni; N is an element from Groups IIA, IIIA, IVA, VA, VIA, IIB, IIIB or VIIB of the periodic table; X is one or more of P, Si, Ge, As, and S; $0 \le a \le 1$; $0 \le b \le 0.10$; $0.8 \le c \le 1.2$; and $0.9 \le d \le 2.2$. In some embodiments, amorphous or partially amorphous materials are provided in which the as-prepared composition contains lithium at a concentration of at least about 5% by mole relative to the transition metal concentration, in some instances at least about 10%, at least about 25%, or at least about 50%. In certain embodiments, the advantageous properties of amorphous nanoscale ion storage materials as described herein may be augmented by doping with foreign ions, such as metals or anions. However, doping is not required for an amorphous nanoscale material to exhibit special properties. In certain embodiments, amorphous or partially amorphous nanoscale ion storage materials are provided having the formula $Li_{1-x}MXO_4$, where M is one or more transition metals, such as, for example, V, Cr, Mn, Fe, Co and Ni; X is one or more of P, Si, Ge, As, S; and $0 \le x \le 1$. In some embodiments, x ranges between zero and one during lithium insertion and de-insertion reactions.

In some embodiments, lithium deficiency is used to promote the formation of amorphous or partially amorphous materials. In at least some instances, greater lithium deficiency results in a more amorphous material. In certain embodiments, amorphous or partially amorphous nanoscale lithium transition metal phosphate materials are provided, which in the as-prepared state contain lithium at a concentration of no more than about 95% by mole relative to the transition metal concentration, for example, no more than about 85%, no more than about 75%, or no more than about 50%. In certain embodiments, amorphous or partially amorphous nanoscale ion storage materials are provided having the formula $Li_{1-x}MXO_4$, where M is one or more transition metals, such as, for example, V, Cr, Mn, Fe, Co and Ni; X is one or more of P, Si, Ge, As, S; and x in the as-prepared material is at least about 0.05, in some instances at least about 0.1, at least about 0.15, at least about 0.2, at least about 0.3, or at least about 0.5.

The amorphous material in some instances comprises more than one specific composition. For example, amorphous $Li_{1-x}FePO_4$ can exist over a wide range of x from zero to one. In some instances, an amorphous material or materials co-exist with a crystalline phase or phases. In various embodiments, the amorphous material or materials have the same, or different, composition compared to the crystalline phase or phases. When procedures are taken as described herein to produce an amorphous state in doped nanoscale materials, such as those having a composition as described in US2004/0005265, the amorphous phase may have a different dopant solubility than the crystalline material. When procedures are taken to produce the undoped materials in the amorphous state, the amorphous material may have a different lithium concentration. Such differences in composition may exist in the material as it is synthesized, or may occur during use, such as upon being lithiated or delithiated by chemical means or by electrochemical means in a storage battery. The amorphous phase or phases may have different alkali ion insertion and removal potentials compared to bulk crystalline or nanocrystalline phases. When combined with the characteristic of being nanoscale, such amorphous or mixed amorphous-crystalline materials may have the attributes of high alkali ion storage capacity and high rate capability. In particular, they are useful as the positive electrode material in lithium storage batteries.

In some embodiments, amorphous or partially amorphous nanoscale ion storage materials are provided in the as-prepared state (e.g., as-fired, or prior to use in a storage battery). In certain embodiments, such materials are prepared from highly homogeneous precursors at low temperatures. Suitable processes for producing the materials include, without limitation, wet-chemical processes, such as co-precipitation or sol-gel methods; physical vapor deposition; chemical vapor methods; mechanochemical methods, where chemical reaction is promoted by the application of mechanical energy, such as by grinding; heat treatment of solid-reactants; and combinations of such methods. When heat treatment is used, heat treatment temperatures are kept below about 800° C., and heat treatment gas atmosphere may be varied, and controlled by methods well-known to those skilled in the art, to achieve a desired metal valence state in the material produced.

In certain embodiments, amorphous or partially amorphous nanoscale ion storage materials are produced from an initially crystalline or predominantly crystalline nanoscale material by electrochemical lithiation or delithiation. A "predominantly crystalline" material may include at least about 50% by weight or volume of the active material. In some embodiments, the material includes at least about 75%, or at least about 90%, or at least about 95%, or at least about 99% by weight or volume of a crystalline phase. In some instances, the initial crystalline nanoscale material is prepared as described in U.S. patent application Ser. No. 11/396,515, now U.S. Pat. No. 7,939,201. In some instances, the initial crystalline material is an olivine material having the formula $Li_{1-x}MPO_4$, where M is one or more transition metals and $0 \leq x \leq 1$. In certain embodiments, M includes Fe. In some embodiments, M comprises more than one transition metal, for example, Fe and another transition metal, such as Mn. At least about 5% by weight of the initially crystalline active material may become amorphous after charging or discharging. In other embodiments, at least about 10%, or at least about 20% by weight or volume of the initially crystalline active material becomes amorphous.

The amorphous materials resulting upon lithiation or delithiation have significantly altered physical properties compared to the initial nanoscale, but crystalline, counterparts. For example, such materials may have altered phase stability, including increased mutual solubility of lithium when the material comprises two or more coexisting phases, more isotropic and faster lithium ion diffusion, and higher electronic conductivity. In amorphous materials, a complete lithium solid solution may occur over a wider range of lithium concentration at any given temperature and particle size than is possible in the counterpart crystalline materials. In at least some instances, when being intercalated and de-intercalated with lithium during use as a storage electrode, a higher rate of lithium acceptance and removal is obtained, and/or decreased mechanical stresses and related mechanical failure events such as fracture and fatigue are achieved. This is because the amorphous compound generally will have isotropic ion and electron transport, whereas many crystalline materials have anisotropic transport. Also, in the amorphous material, a larger range of solid solution for ions decreases lattice mismatch, which often occurs between crystalline phases coexisting during electrochemical use and results in fracture and fatigue. The amorphous material also offers an absence of dislocations, the accumulation of which can lead to fracture and fatigue.

In certain embodiments, an amorphous or partially amorphous nanoscale ion storage material is provided in a rechargeable battery by electrochemically disordering an initially substantially crystalline lithium storage compound. In some instances, the amorphous ion storage material remains permanently in the amorphous state. In other cases, the amorphous material crystallizes over a time scale ranging from seconds to many days. Providing an amorphous material in this way is advantageous because it allows for production of a desirable but difficult-to-synthesize amorphous storage material from a crystalline material that is more easily produced. For example, a highly lithiated olivine positive electrode material is often desirable as a starting material, since it generally provides the active lithium in a lithium ion cell. However, such compositions may crystallize easily, and for the reasons given earlier it may be desirable to have, in use, an amorphous active material. Thus, by providing an initially crystalline olivine that is then transformed to an amorphous phase, both objectives are met. Also, the availability of the amorphous material, even temporarily, may improve electrochemical storage properties, such as energy and power.

As another non-limiting example, many compounds of the ordered olivine structure undergo a first-order phase transition during electrochemically-induced ion insertion and removal. In the crystalline state, one crystalline phase must transform to another during charging, and back again during discharging. The charging and discharging rate of the battery is determined by the rate at which this phase transition occurs. Often there exists a large lattice mismatch between the two crystalline phases, resulting in undesirable effects such as an elastic energy barrier to phase transformation, a slow rate of phase transformation, and mechanical stresses. These effects are manifested as diminished battery energy or power, or poor cycle life. (See, e.g., Meethong et al., "Strain accommodation during phase transformations in olivine-based cathodes as a materials selection criterion for high-power rechargeable batteries," *Adv. Functional Mater., In press* 2006; U.S. patent application Ser. No. 11/396,515, now U.S. Pat. No. 7,939, 201.) When a crystalline material is rendered amorphous by charging or discharging, an intermediate structural state is provided, thereby mitigating the elastic misfit between coexisting phases. While not to be bound by any particular theory, this may occur by having a structurally disordered amorphous region separating the two crystalline phases at the particle level, and/or by having an entire particle transformed to an amorphous state while lithium is removed or inserted, after which the amorphous material crystallizes.

Not only are the composition and structure of the amorphous nanoscale materials described herein distinct from previously known ion storage materials, there are improvements in properties that enable performance in a lithium battery which are not available from the conventional, crystalline lithium metal phosphates or amorphous metal phosphates. For example, it is known that the well-ordered olivine $LiFePO_4$ structure has one-dimensional lithium diffusion channels. It has been considered in the published literature that this aspect of the structure is detrimental to electrochemical performance, especially at high rates. For instance, it has been argued in published literature that disorder between Li and Fe in the ordered olivine structure is responsible for poor storage capacity and rate capability (e.g., Yang et al., *Electrochem. Comm.*, 4:239 (2002)). By contrast, amorphous materials such as those described herein have isotropic ion diffusion, thereby allowing a higher storage capacity at any particular charge-discharge rate. Furthermore, the electronic transport properties of crystalline lithium transition metal phosphates are highly sensitive to cation ordering. For example, in ordered olivine $LiFePO_4$, electronic transport properties are sensitive to both the Li and Fe ordering. In particular, electron localization in the crystalline structure limits electron mobility, and results in too low an electronic conductivity for practical use of the conventional olivine. In contrast, the disordered, amorphous materials described herein have different, mostly disordered cation arrangements. Thus, these amorphous materials are reasonably expected to have different electronic structure and transport properties compared to commonly known crystalline materials. In particular, in the present amorphous materials, more delocalized electronic carriers provide higher electronic conductivity, which is important to realizing high rate, high energy storage electrodes.

The data presented in the Examples below demonstrate that an amorphous or partially amorphous material as described herein having an approximate composition $Li_{1-x}FePO_4$ and having nanoscale dimensions does not form the equilibrium phase assemblages expected by those skilled in the art. This material was heated to 600° C., which is well above the phase separation temperatures of 150-200° C. shown in recent published phase diagrams (Delacourt et al., *Nature Mater.* 4:254 (2005); Dodd et al., *Electrochem. Solid State Lett.* 9:A151 (2006)), and therefore should afford a single nonstoichiometric crystalline phase. However, the present material does not form or retain this phase upon cooling to room temperature. Nor does it phase separate into the room-temperature equilibrium phases given by the phase diagram (the equilibrium phases being $LiFePO_4$ and $FePO_4$). Instead, the material comprises a mixture of crystalline $LiFePO_4$, which by its X-ray diffraction pattern is distinguishable from conventional $LiFePO_4$ by having broadened peaks, and an amorphous phase. Thus, this class of materials useful for high energy and high power cathodes is clearly distinct from conventional crystalline $LiFePO_4$ or $Li_{1-x}FePO_4$. It is a metastable phase assemblage enabled by having nanoscale dimensions and/or the method of processing and/or the particular composition used for these materials as described herein.

The data presented in the Examples also demonstrate that the nanoscale materials described herein exhibit a novel carbon-containing composition. In particular, the scanning transmission electron microscope data show that the materials studied here, despite having several percent carbon overall, do not have a surface coating of carbon, but instead have carbon detected throughout the material. (See, e.g., the elemental maps in FIGS. 5, 7, 9 and 11.) The X-ray composition maps show that wherever Fe, P and O have increased intensity due to greater sample thickness, the carbon signal is also increased. This shows that the carbon is distinctly not a surface layer, but is bulk carbon. If there were a uniform surface layer of carbon on the particles, it would be expected that the carbon signal would be relatively constant even as the Fe, P and O signals vary, since the total amount of carbon projected in the beam direction would not vary significantly. Thus, it is shown that the materials in question, at least the amorphous phases but also the crystallized portions, have carbon in solid solution. For the undoped materials these comprise Fe—P—O—C or Li—Fe—P—O—C; for the doped materials the dopant is also in solid solution. This is a distinct composition from any prior described amorphous transition metal phosphate used in a battery.

The results described in Example 2 below on an amorphous nanoscale $FePO_4$ sample having a carbon content of 4.68% show that the sample has an electrochemically active, amorphous/disordered Fe—P—O—C phase. This is a unique composition distinct from other known metal phosphate ion storage electrode materials. The results on the several other deliberately lithium-deficient $Li_{1-x}FePO_4$ compositions show that such an amorphous phase is stable in the samples tested. The amorphous phase also can be deduced to contain lithium based on the crystalline olivine fraction seen by XRD relative to the overall composition. Thus, in nanoscale, high specific surface area and/or carbon containing compositions, an amorphous/disordered Li—Fe—P—O—C phase is stable. This is also a unique composition distinct from known materials.

These results indicate that a role of carbon is to stabilize disordered (amorphous and/or nanocrystalline and/or metastable crystalline phase) solid solutions of iron phosphates and lithium iron phosphates (and, by extension, other metal phosphates). This is in contrast to many teachings in the art that have contended that carbon merely acts as a discrete conductive coating, or reduces the iron phosphate to form iron phosphides or other conductive secondary phases.

In certain embodiments, an ion storage compound is provided that contains carbon within the structure of the compound. The compound has a composition $Li_a C_b M_c N_d X_e O_f$, where M is one or more first-row transition metals, such as, for example, Ti, V, Cr, Mn, Fe, Co and Ni; N is an element from Groups IIA, IIIA, IVA, VA, VIA, IIB, IIIB or VIIB of the periodic table; X is one or more of P, Si, Ge, As, S; $0 \le a \le 1$; $0.001 \le b \le 0.10$; $0.8 \le c \le 1.2$; $0 \le d \le 0.10$; $0.9 \le e \le 2.2$; and $3.6 \le f \le 8.8$. In at least some embodiments, the carbon-containing material is amorphous. In at least some embodiments, the carbon-containing material is nanoscale.

In certain embodiments, carbon-containing materials are prepared by wet-chemical processes, such as co-precipitation or sol-gel methods; physical vapor deposition; chemical vapor methods; mechanochemical methods, where chemical reaction is promoted by the application of mechanical energy, such as by grinding; heat treatment of solid-reactants; and combinations of such methods. In some embodiments, the carbon is provided as a constituent of a starting reactant compound, or as a constituent of a precipitated compound, such compounds being exemplified by metal carbonates, alkoxides, and oxalates. In some embodiments, the carbon is contained in the firing atmosphere, for example as carbon monoxide, carbon dioxide or hydrocarbon species. In some embodiments, the carbon is provided by an added material that does not supply a substantial amount of the metal constituents, for example, by a liquid organic solvent, elemental carbon, or an organic compound that decomposes to carbon during firing (including, without limitation, sugars, aromatic compounds, and polymers, including those supplied by the containers or milling media used to prepare the compound).

Small particle size contributes to the ability of a material to form an amorphous phase, either in the as-prepared state or upon lithiation or delithiation. The nanoscale dimensions that realize the benefits as described herein can be characterized by several methods. "Nanoscale," as used herein, refers to materials having a primary particle size with a smallest dimension that is about 500 nm or less, in some instances about 200 nm or less, or about 100 nm or less. If fabricated as a powder, the nanoscale materials have a specific surface area measured by the BET method of at least about 10 $m^2/g$, and an equivalent spherical particle diameter calculated from the BET specific surface area of about 500 nm or less, in some instances about 200 nm or less, or about 100 nm or less.

The nanoscale materials described herein have a BET specific surface area of at least about 10 $m^2/g$. In some instances, the BET specific surface area is at least about 15 $m^2/g$, at least about 20 $m^2/g$, at least about 25 $m^2/g$, at least about 30 $m^2/g$, at least about 35 $m^2/g$, at least about 40 $m^2/g$, at least about 45 $m^2/g$, or at least about 50 $m^2/g$. As used herein, the "BET" method refers to the method of Brunauer, Emmett and Teller, well-known to those skilled in the art of powder characterization, in which a gas phase molecule (such as $N_2$) is condensed onto the surfaces of a material at a temperature (such as 77 K) where the coverage of condensed gas per unit area is well-known, and the total amount of condensed gas on the sample is then measured upon being liberated by heating.

For a given value of the BET specific surface area, and knowing the specific gravity of the material, it is also possible to calculate a corresponding "equivalent spherical particle diameter." This is the particle diameter that would result in the measured surface area if the material were in the form of identically-sized spherical particles, and is a good approximation of the number-averaged or mean particle size if the particle shape is equi-axed. The nanoscale materials described herein typically have an equivalent spherical particle diameter of about 500 nm or less, and in some cases about 200 nm or less. In some instances, the equivalent spherical particle diameter is about 150 nm or less, for example, about 100 nm or less, about 75 nm or less, about 50 nm or less, or about 25 nm or less.

Furthermore, in some instances the size of the primary particles can be determined by X-ray line-broadening methods well-known to those skilled in the art. Thus, in certain embodiments, the nanomaterials described herein have an average (i.e., mean) diameter of about 500 nm or less, and in some cases about 200 nm or less. In some instances, the average diameter is about 150 nm or less, for example, about 100 nm or less, about 75 nm or less, about 50 nm or less, or about 25 nm or less.

The unique properties of a nanomaterial may depend on the smallest cross-sectional dimension. Cross-sectional dimension is here understood to be that family of straight lines that can be drawn through the center of mass of an isolated or separable object. By assuming spherical morphology, the equivalent spherical particle size gives the largest average cross-sectional dimension of a particulate material. On the other hand, a very thin but continuous film, or a very thin but continuous fiber, can exhibit nanoscale effects, even though the dimensions are far larger than nanoscale in the plane of the film or along the axis of the fiber. However, if the smallest cross-sectional dimension, namely the thickness of the film or the diameter of the fiber, is sufficiently small, nanoscale properties may be obtained. Thus, in certain embodiments, for anisometric particles, the specific surface area and the equivalent spherical particle size may not adequately define the characteristic dimension below which the nanomaterial will exhibit special properties. That is, for highly anisometric particle shapes, in some instances the BET surface area can be larger than the above-mentioned values, yet the material still will exhibit a smallest characteristic dimension sufficiently small to exhibit nanoscale properties as described herein.

In some embodiments, the primary particles of a nanoscale powder exhibit a smallest cross-sectional dimension that is, on a number-averaged basis to provide a mean value, about 500 nm or less, and in some cases about 200 nm or less. In some instances, the smallest cross-sectional dimension is about 150 nm or less, for example, about 100 nm or less, about 75 nm or less, about 50 nm or less, or about 25 nm or less. These dimensions can be measured using various methods, including direct measurement with an electron microscope of the transmission or secondary-electron type, or with atomic force microscopy. Herein, a primary particle dimension is considered to be the characteristic spatial dimension that a BET surface area measurement would interrogate by adsorbing gas onto exposed surfaces of the material. In the case of an aggregated powder, the agglomerate may have an average particle size of less than about 800 nm, or less than about 600 nm, or less than about 500 nm, or less than about 300 nm. In some embodiments, the nanoscale material is a thin film or coating, including a coating on a particle of any size, in which the film or coating has an average thickness of about 500 nm or less, in some cases about 200 nm or less, for example, about 150 nm or less, about 100 nm or less, about 50 nm or less, or about 25 nm or less. The thickness of the film or coating can be measured by various methods including transmission electron microscopy or other microscopy methods that can view the film or coating in cross-section.

In certain embodiments, for use as a storage electrode, an ion storage material as described herein typically is formulated into an electrode by standard methods, including the addition of a few weight percent of a polymeric binder, and (e.g., if the material does not already include sufficient carbon) less than about 10 weight percent of a conductive additive, such as carbon. In at least some such embodiments, the electrodes typically are coated onto one or both sides of a metal foil, and optionally pressed to a coating thickness of between about 30 micrometers and about 200 micrometers, providing a charge storage capacity of between about 0.25 mAh/cm$^2$ and about 2 mAh/cm$^2$. Such electrodes are suitable for use as the positive or negative electrode in a storage battery. Their performance can be evaluated, for example, using laboratory cells of the coin-cell or so-called Swagelok™ cell types, in which a single layer of electrode is tested against a counterelectrode (typically lithium metal when the nanoscale material is a lithium storage material) using galvanostatic (constant current) or potentiostatic (constant voltage) tests or some combination of the two. Under galvanostatic conditions, the current rate can be described as "C-rate," in which the rate is C/n, and n is the number of hours required for substantially complete charge or discharge of the cell between a selected upper and lower voltage limit.

In certain embodiments, an ion storage material as described herein is used as the positive electrode in a lithium battery. In such embodiments, the electrodes are typically assembled into multilayer laminated cells of wound or stacked configuration, using lithium metal or an anode-active lithium storage electrode as the negative electrode. Non-limiting examples of suitable negative electrode materials include lithium metal, carbon, an intermetallic compound, or a metal, metalloid or metal alloy that includes such lithium-active elements as Al, Ag, B, Bi, Cd, Ga, Ge, In, Pb, Sb, Si, Sn or Zn. The negative electrode material can be selected or designed for high capacity and high rate capability. The storage batteries thus assembled can employ a porous electronically insulating separator between the positive and negative electrode materials, and a liquid, gel or solid polymer electrolyte. In certain embodiments, the storage batteries employ electrode formulations and physical designs and constructions developed through methods well-known to those skilled in the art to provide low cell impedance, so that the high rate capability of the ion storage material as described herein is utilized.

The following non-limiting examples further illustrate certain embodiments.

Example 1

Figure 2A:
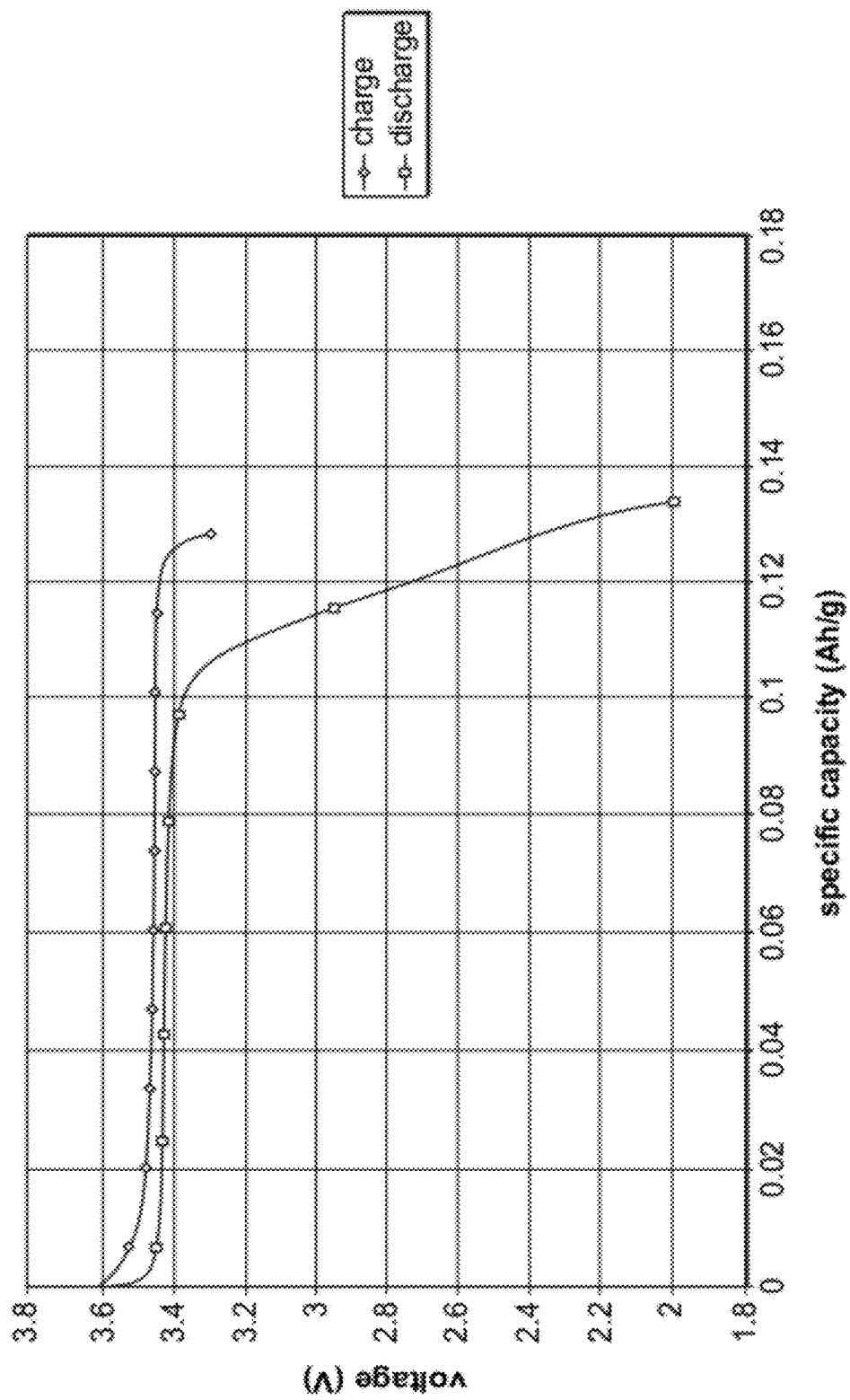
FIGS. 2A, B and C are plots showing the capacity on charge and discharge for cycle 1 at C/50 rate for Swagelok™ type lithium half-cells made from samples A, B, and C, respectively.
Figure 2B:
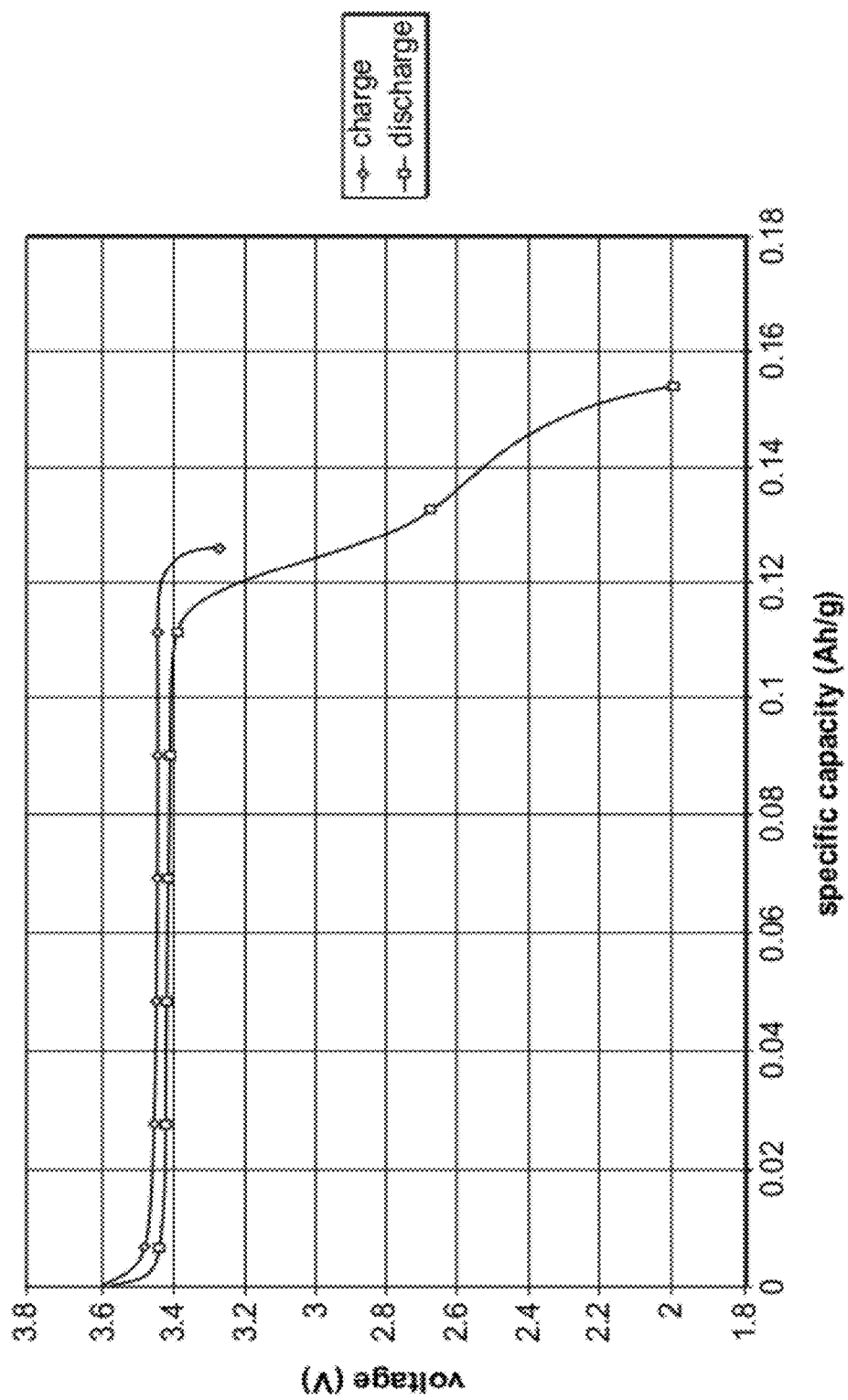

Compositions of undoped $Li_{0.90}FePa_4$, $Li_{1.0}FePO_4$, and $Li_{0.95}FePO_4$ were prepared from the starting raw materials $Li_2CO_3$, $FeC_2O_4.2H_2O$, and $(NH_4)H_2PO_4$. The starting raw materials were ball-milled using steel milling balls in a polypropylene jar with ketone solvent for 72 hours, then dried. The dried material was then fired in flowing nitrogen gas atmosphere, first at 350° C. for 10 hours, then at 600° C. for 20 hours. The resultant samples were labeled A ($Li_{0.90}FePO_4$), B ($Li_{1.0}FePO_4$), and C ($Li_{0.95}FePO_4$). The samples were found to be nanoscale, having BET specific surface areas of 38.43, 39.48, and 33.60 m$^2$/g, respectively. The samples had carbon contents of 5.43%, 4.90% and 4.63%, respectively. These powders were made into Swagelok™ type lithium half-cells, and tested at low and high rates. FIG. 1 is a plot of discharge capacity at various C-rates. Each curve is an average of three cells. The results show that the materials are capable of high capacities at high rates. FIGS. 2A, B and C are plots showing the capacity on charge and discharge for cycle 1 at C/50 rate for samples A (0.0900 mol $Li_2CO_3$), B (0.1000 mol $Li_2CO_3$), and C (0.0950 mol $Li_2CO_3$), respectively. These results at low rates show an extended lower-voltage discharge "tail" indicating solid solution behavior.

Two of the samples, A and B, were then examined in the Vacuum Generators HB603 Scanning Transmission Electron Microscope ("STEM"), and images were recorded and compositions and composition maps taken using energy-dispersive X-ray analysis. Lithium is not detectable by this method, but oxygen, iron and phosphorus are. The results are shown in FIGS. 3-12 and Tables 1-2.

Figures 3, 3A, 3B:
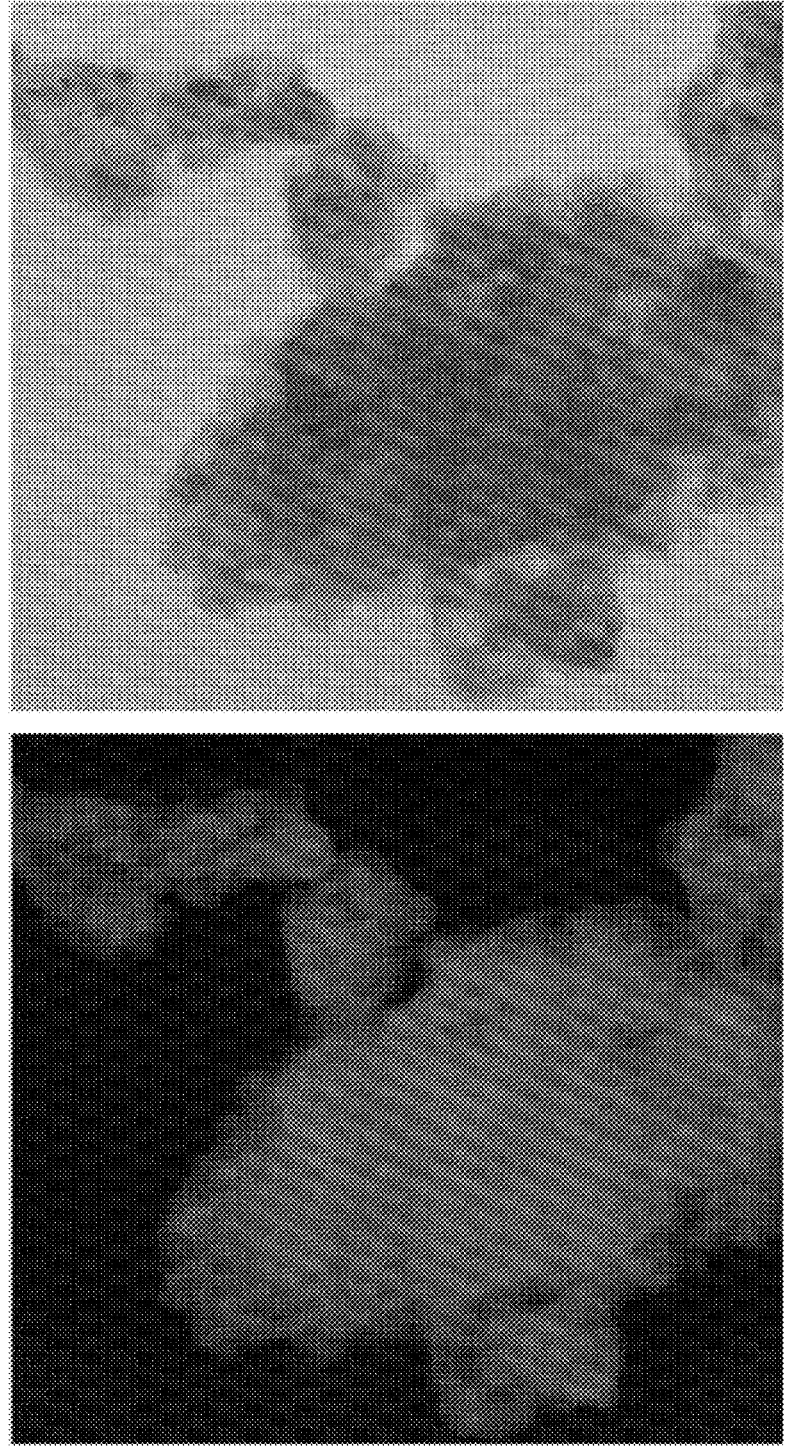
FIGS. 3A-B show scanning transmission electron microscope ("STEM") dark field and bright field images, respectively, of sample B.

FIGS. 3A-B show dark field and bright field images, respectively, of sample B. FIGS. 4A-G show spectra at different locations of the sample. Table 1 summarizes the P content, Fe content, and phase results for each location.

TABLE 1

Figure 4A:
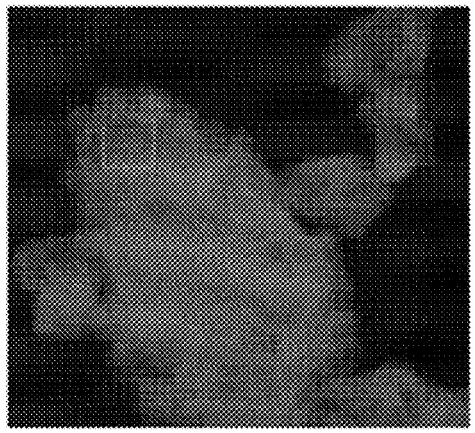
FIGS. 4A-G show spectra at different locations of the sample from FIG. 3.
Figure 4B:
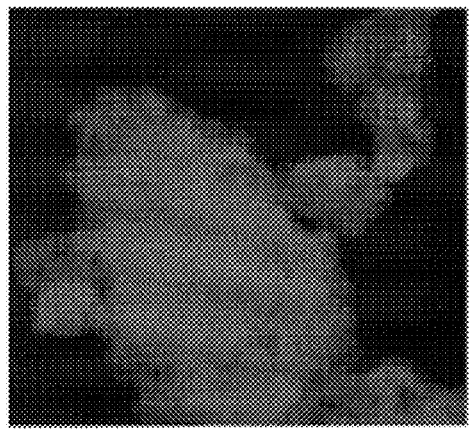
Figure 4C:
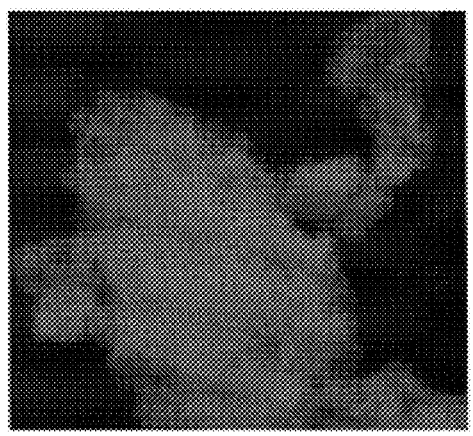
Figure 4D:
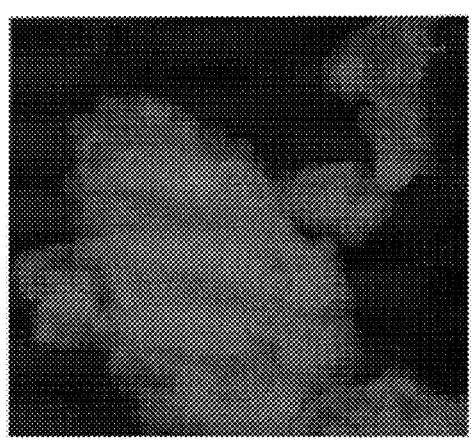
Figure 4E:
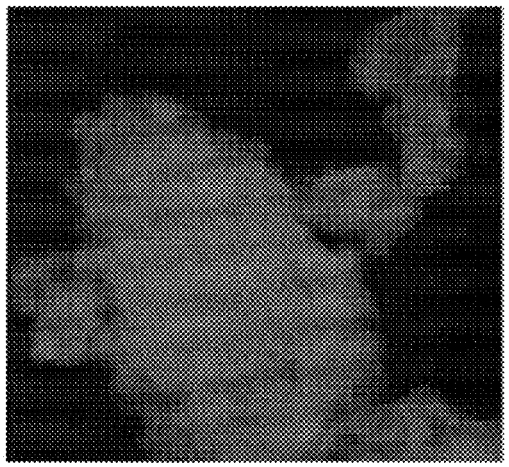
Figure 4F:
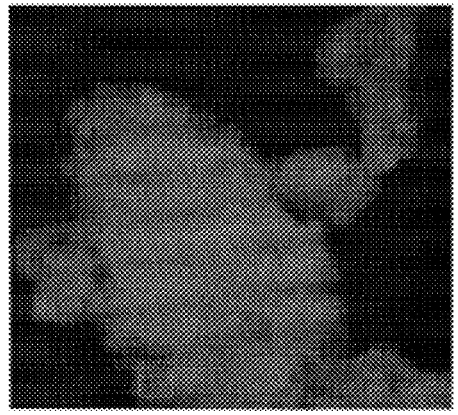
Figure 4G:
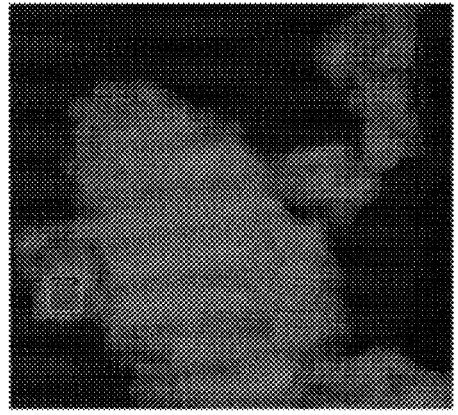

|  | P | Fe | Phase |
| --- | --- | --- | --- |
| Sum Spectrum | 50.17 | 49.83 | $FePO_4$ (with Li) |
| FIG. 4A | 51.05 | 48.95 | $FePO_4$ (with Li) |
| FIG. 4B | 40.42 | 59.58 | $FePO_4$ (with Li) |
| FIG. 4C | 33.19 | 66.81 | $Fe_2P$ |
| FIG. 4D | 49.97 | 50.03 | $FePO_4$ (with Li) |
| FIG. 4E | 51.76 | 48.24 | $FePO_4$ (with Li) |
| FIG. 4F | 48.91 | 51.09 | $FePO_4$ (with Li) |
| FIG. 4G | 50.4 | 49.6 | $FePO_4$ (with Li) |

Figure 5A:
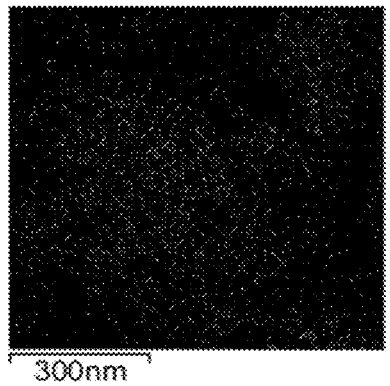
FIGS. 5A, B, C and D show, respectively, C, Fe, P and O elemental maps for the sample from FIG. 3.
Figure 5B:
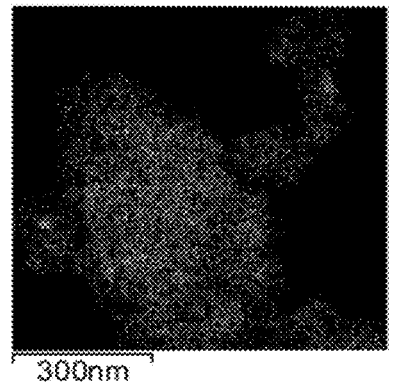
Figure 5C:
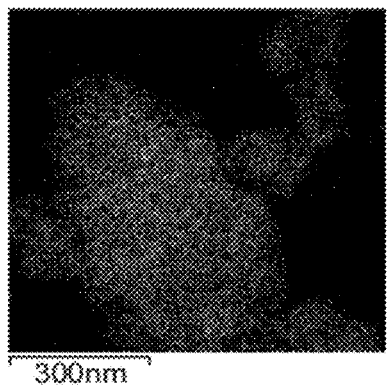
Figure 5D:
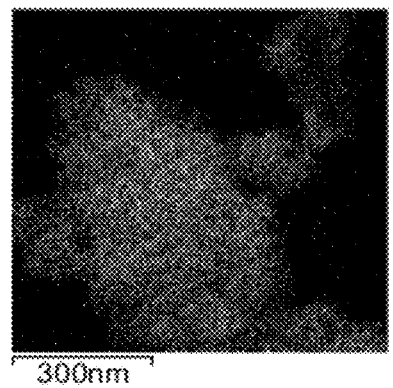
Figure 6:
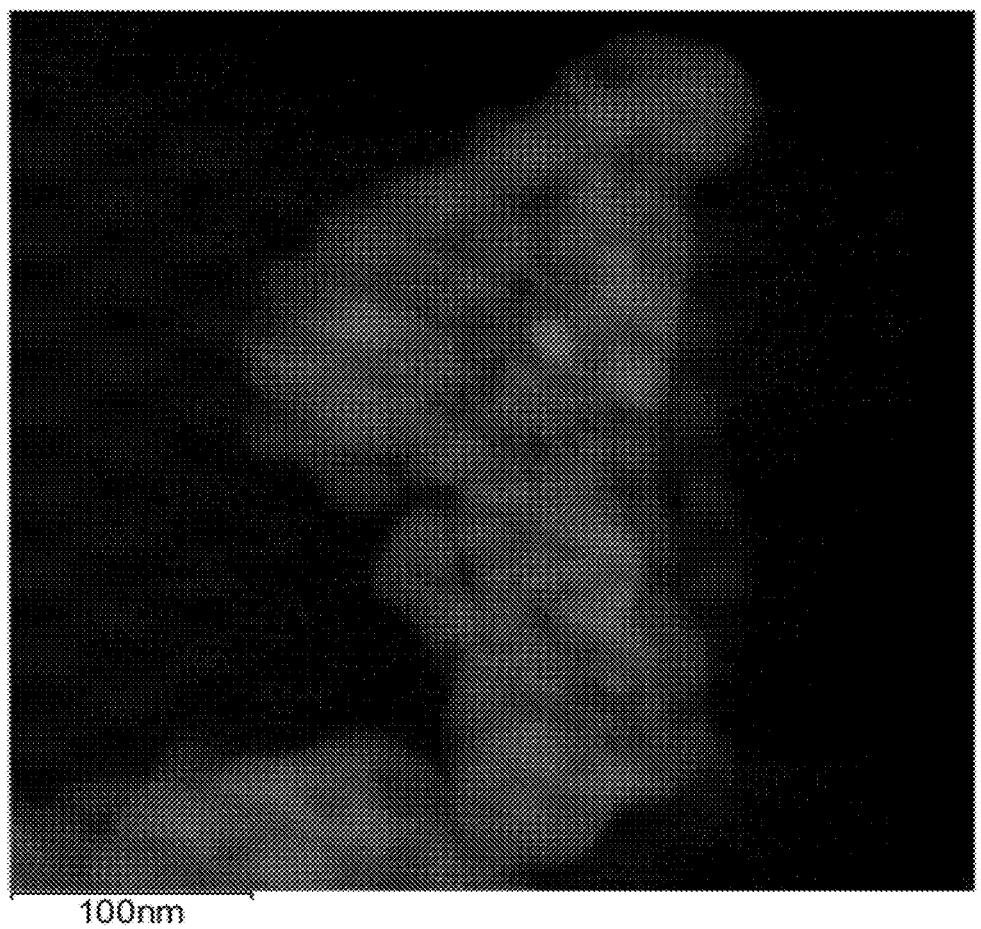
FIG. 6 shows another STEM image of sample B.

FIGS. 5A, B, C and D show, respectively, C, Fe, P and O elemental maps for the sample. FIG. 6 shows another image of sample B. FIGS. 7A, B, C, D and E show, respectively, C, Fe, P, O and S elemental maps for the sample.

Figure 8:
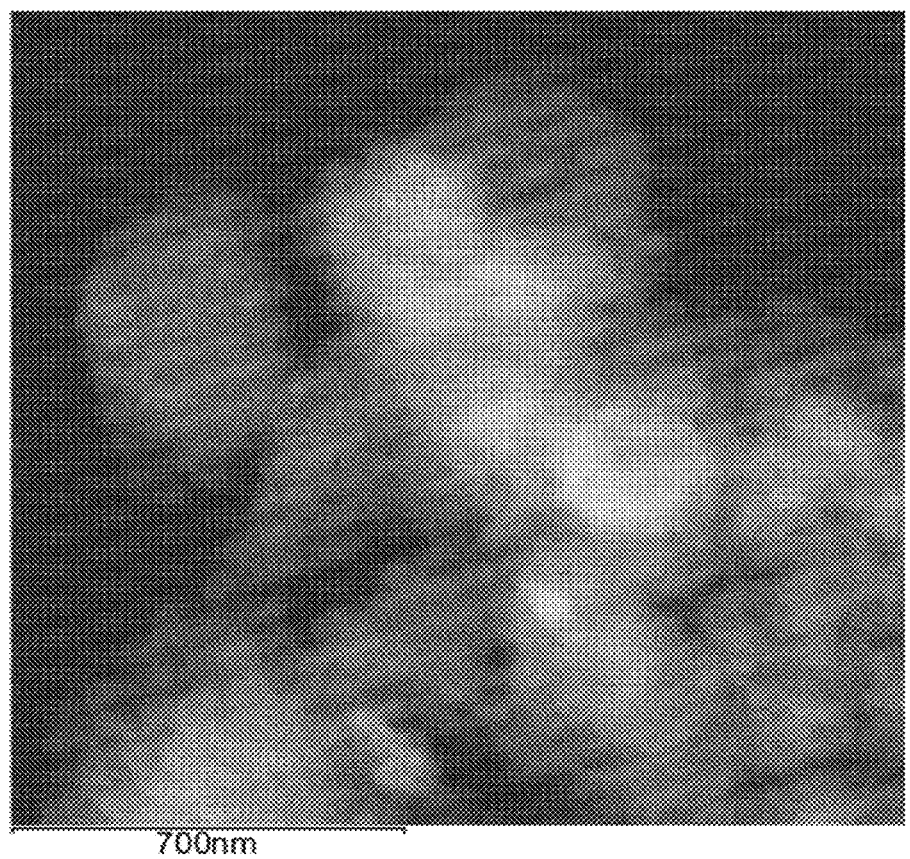
FIG. 8 shows a STEM image of sample A.
Figure 10:
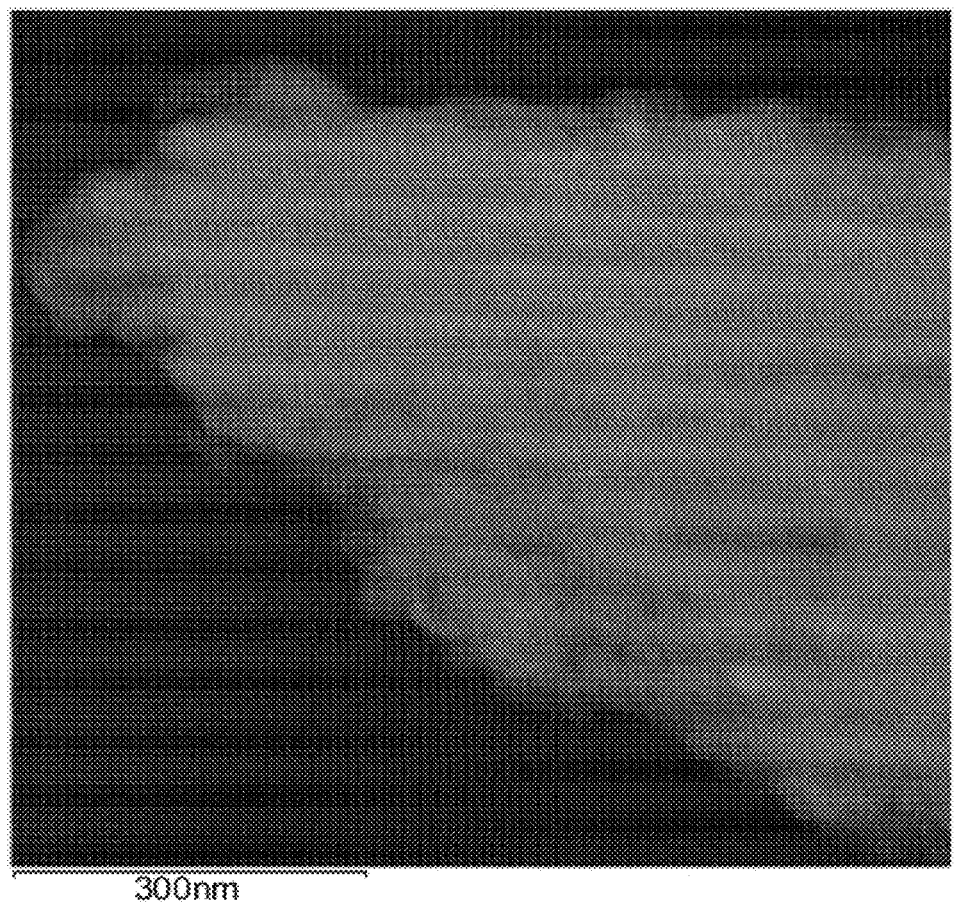
FIG. 10 shows another image of sample A.
Figure 11A:
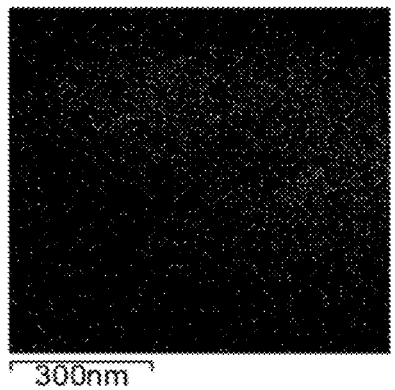
FIGS. 11A, B, C and D show, respectively, C, Fe, P and O elemental maps for the sample from FIG. 10.
Figure 11B:
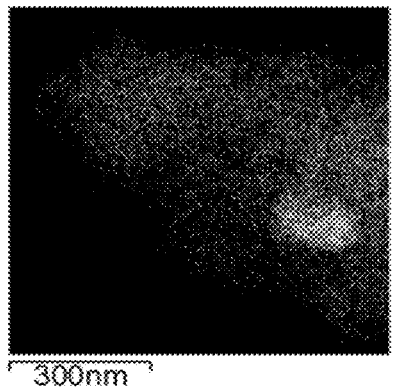
Figure 11C:
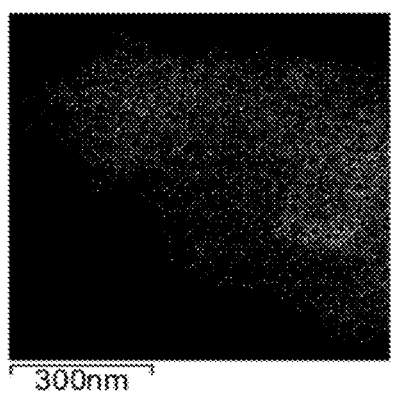
Figure 11D:
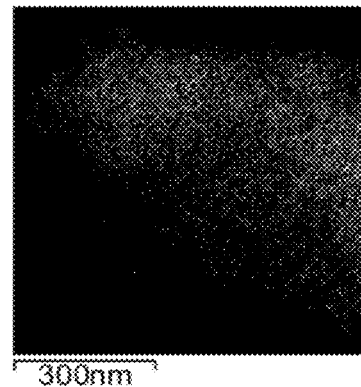

FIG. 8 shows an image of sample A. FIGS. 9A, B, C and D show, respectively, C, Fe, P and O elemental maps for the sample. FIG. 10 shows another image of sample A. FIGS. 11A, B, C and D show, respectively, C, Fe, P and O elemental maps for the sample. FIGS. 12A-E show spectra at different locations of the sample. Table 2 summarizes the P content, Fe content, and phase results for each location.

TABLE 2

Figure 12B:
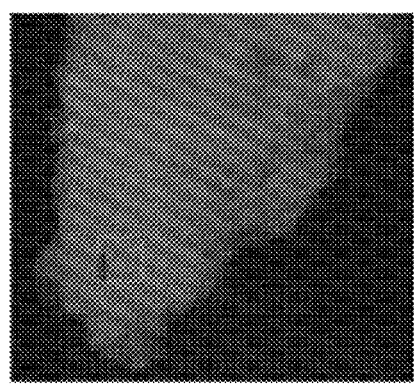
FIGS. 12A-E show spectra at different locations of the sample from FIG. 10.
Figure 12A:
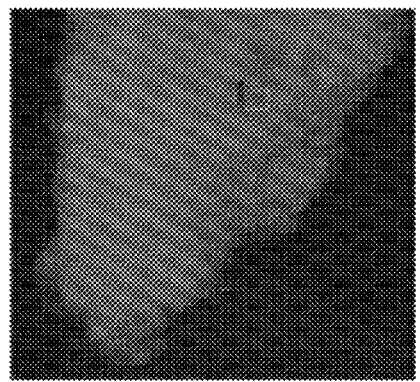
Figure 12E:
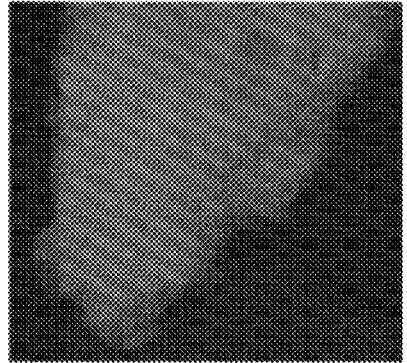
Figure 12D:
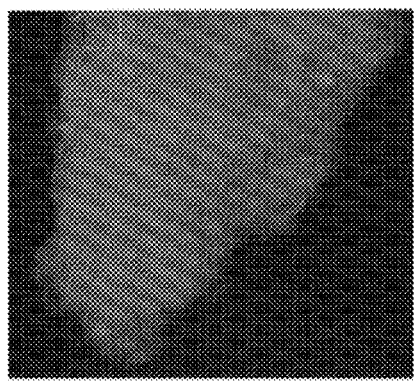
Figure 12C:
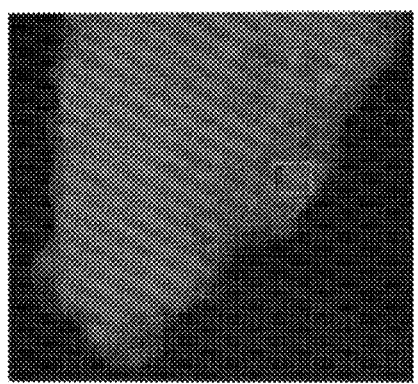

|  | P | Fe | Phase |
| --- | --- | --- | --- |
| FIG. 12A | 38.25 | 61.75 | $Fe_2P$ |
| FIG. 12B | 50.01 | 49.99 | $FePO_4$ (with Li) |
| FIG. 12C | 50.41 | 49.59 | $FePO_4$ (with Li) |
| FIG. 12D | 50.57 | 49.43 | $FePO_4$ (with Li) |
| FIG. 12E | 48.24 | 51.76 | $FePO_4$ (with Li) |

These analyses showed that the material was indeed nanoscale. Moreover, during the STEM analysis it was observed that the nanoscale material exhibited virtually no diffraction contrast, indicating that most particles were amorphous rather than crystalline. There was no detectable surface coating enriched in either Fe or P, and deficient in O, as might be expected for a surface coating of iron phosphide. The only iron phosphide detected was as infrequent isolated particles, for which the Fe:P ratio of about 2:1 suggested that it was $Fe_2P$.

Figure 13:
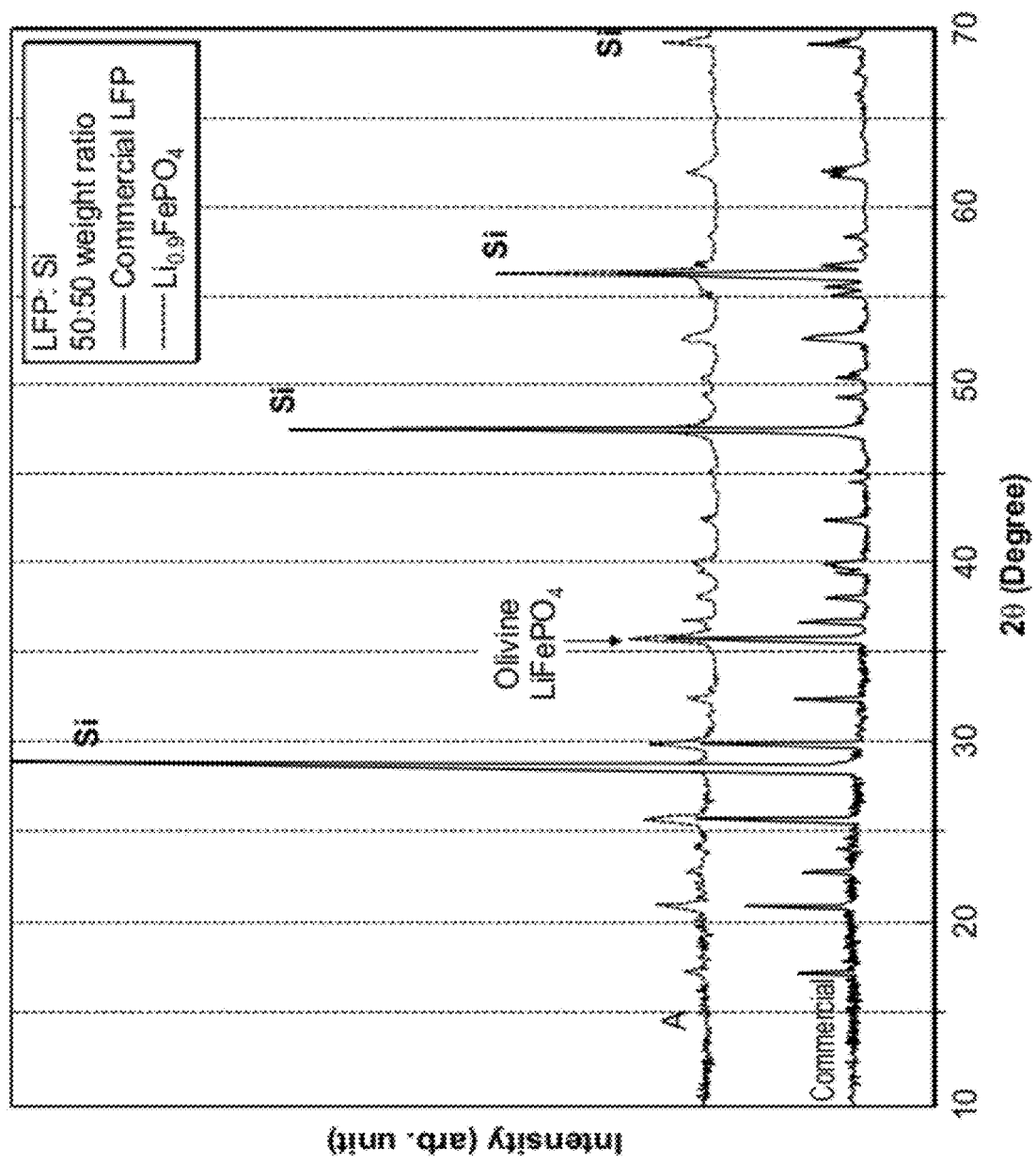
FIG. 13 shows X-ray diffraction patterns of sample A and commercial highly crystalline LiFePO$_4$ (labeled as having carbon added), with 50 wt % of a crystalline silicon powder added to each sample.

To further investigate the amorphous character, X-ray diffraction was conducted on sample A and a commercially purchased (Aldrich Chemical) sample of highly crystalline "battery grade" $LiFePO_4$ (labeled as having carbon added). In each case, 50 wt % of a crystalline silicon powder was added to the sample to serve as an internal standard. FIG. 13 shows the XRD patterns of the two samples. It was seen that while peaks corresponding to crystalline $LiFePO_4$ olivine are seen in both samples, the peaks are broader in sample A, and the ratio of the olivine peak intensities to the Si peak intensities is much lower in sample A, by about a factor of 3, showing that it has a significant amount of amorphous phase, consistent with the STEM results.

Figure 14:
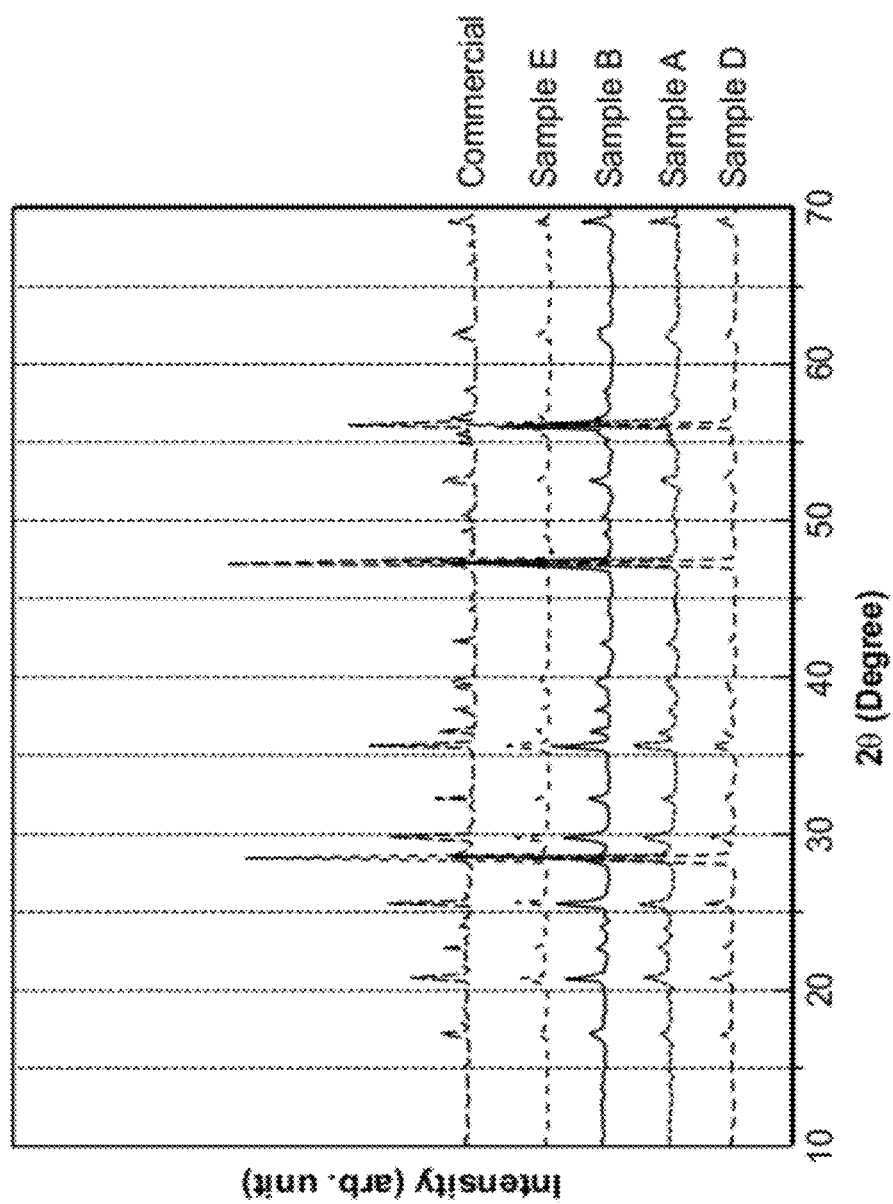
FIG. 14 shows X-ray diffraction patterns of samples A, B, commercial LiFePO$_4$, and two different samples of 1% Nb-doped LiFePO$_4$ (samples D and E), each mixed with 50 wt % crystalline silicon powder.
Figure 15A:
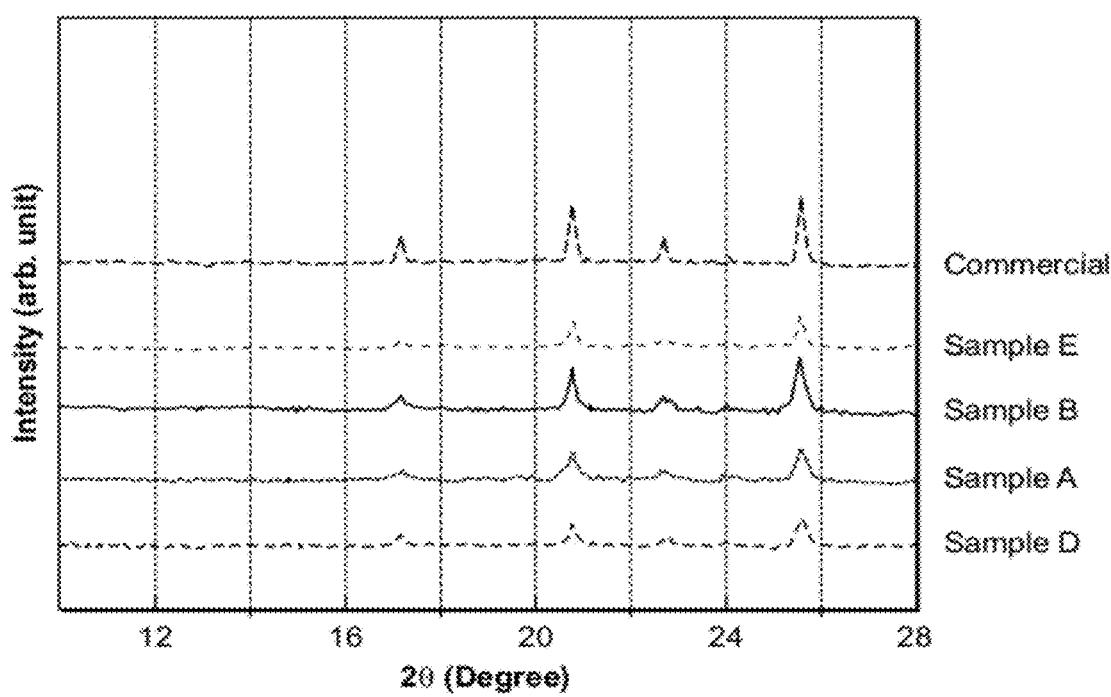
FIGS. 15A-B show X-ray diffraction patterns of samples A, B, D, E and commercial LiFePO$_4$, each mixed with 50 wt % crystalline silicon powder.
Figure 15B:
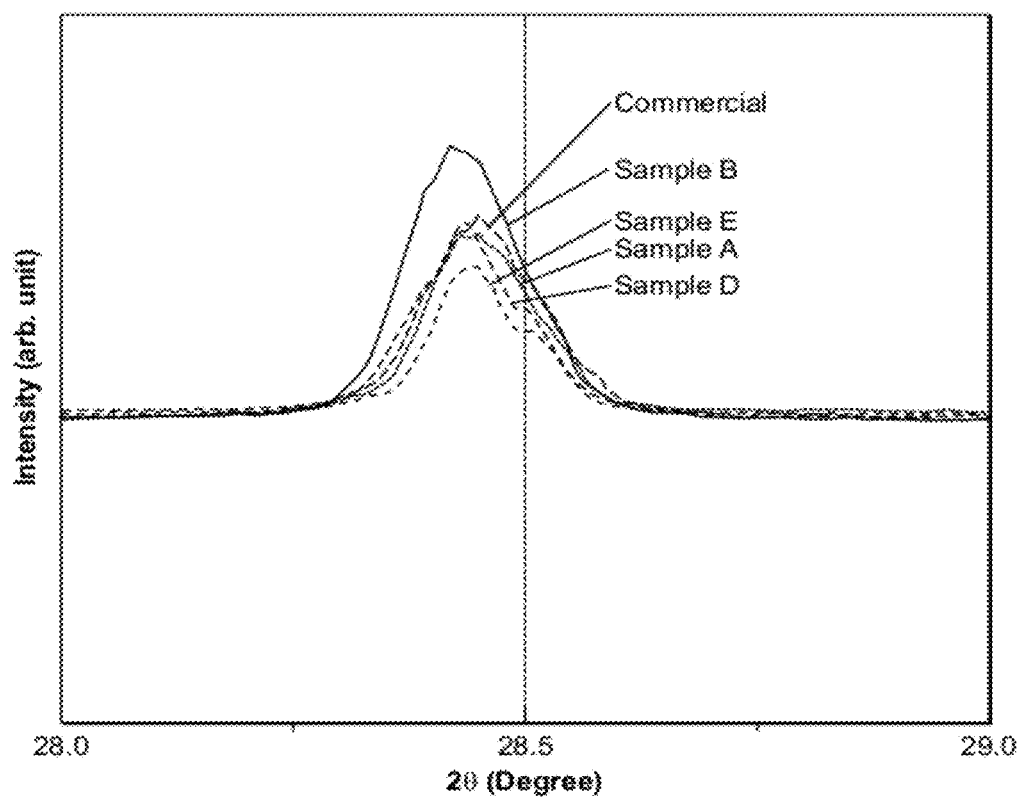

More samples were compared by the same XRD method, as shown in FIGS. 14 and 15. Sample B, and two different samples of 1% Nb-doped $LiFePO_4$ (designated samples D and E) were each mixed with 50 wt % crystalline silicon powder and X-rayed. Samples D and E were made by the same method as the undoped samples A-C, except that niobium oxalate was added as a starting raw material in the amount necessary to achieve the desired composition. In each case, the nanoscale phosphate powder, whether doped or undoped, was seen to have much lower olivine peak intensities than the reference powder, showing a large if not dominant fraction of the material to be amorphous. Peak locations were similar in all of the powders, and only the peak intensities differed. The commercial powder had high peak intensities for every peak. (The three strongest peaks and the peak at about 69° in FIG. 14 belonged to Si.)

These results demonstrate that doped or undoped nanoscale olivine $LiFePO_4$ of amorphous or partly amorphous structure has high energy density and rate capability suitable for lithium rechargeable batteries. The results also show that the tested doped and undoped $LiFePO_4$ samples are at least partly amorphous, distinguishing them from the crystalline $LiFePO_4$ materials that others have reported.

Example 2

Figure 16:
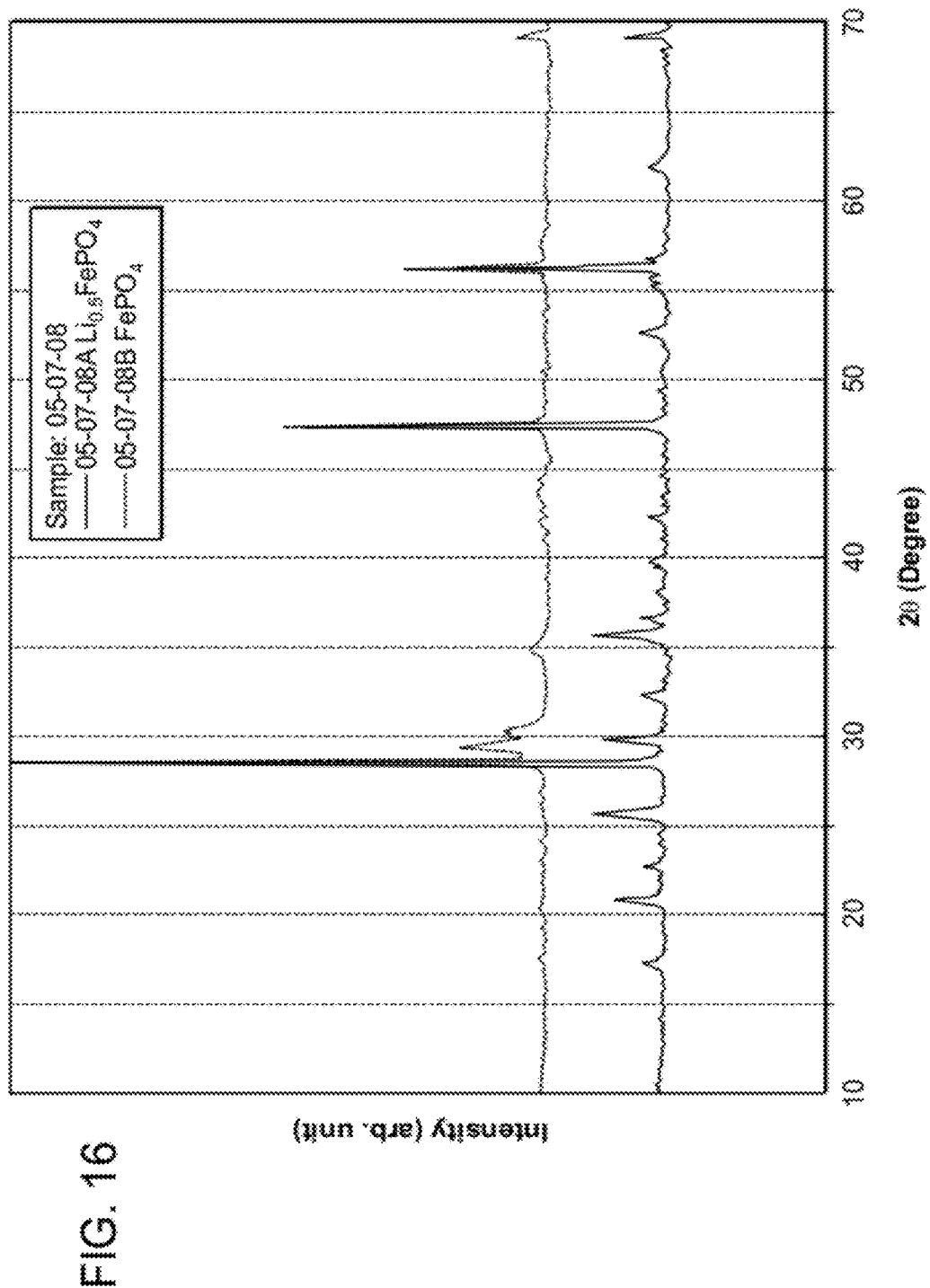
FIG. 16 shows X-ray diffraction patterns of Li$_{0.5}$FePO$_4$ (sample F) and FePO$_4$ (sample G), having BET surface areas of 42.86 m$^2$/g and 22.96 m$^2$/g, and carbon contents of 4.00% and 4.68%, respectively, each mixed with 50 wt % Si.
Figure 17:
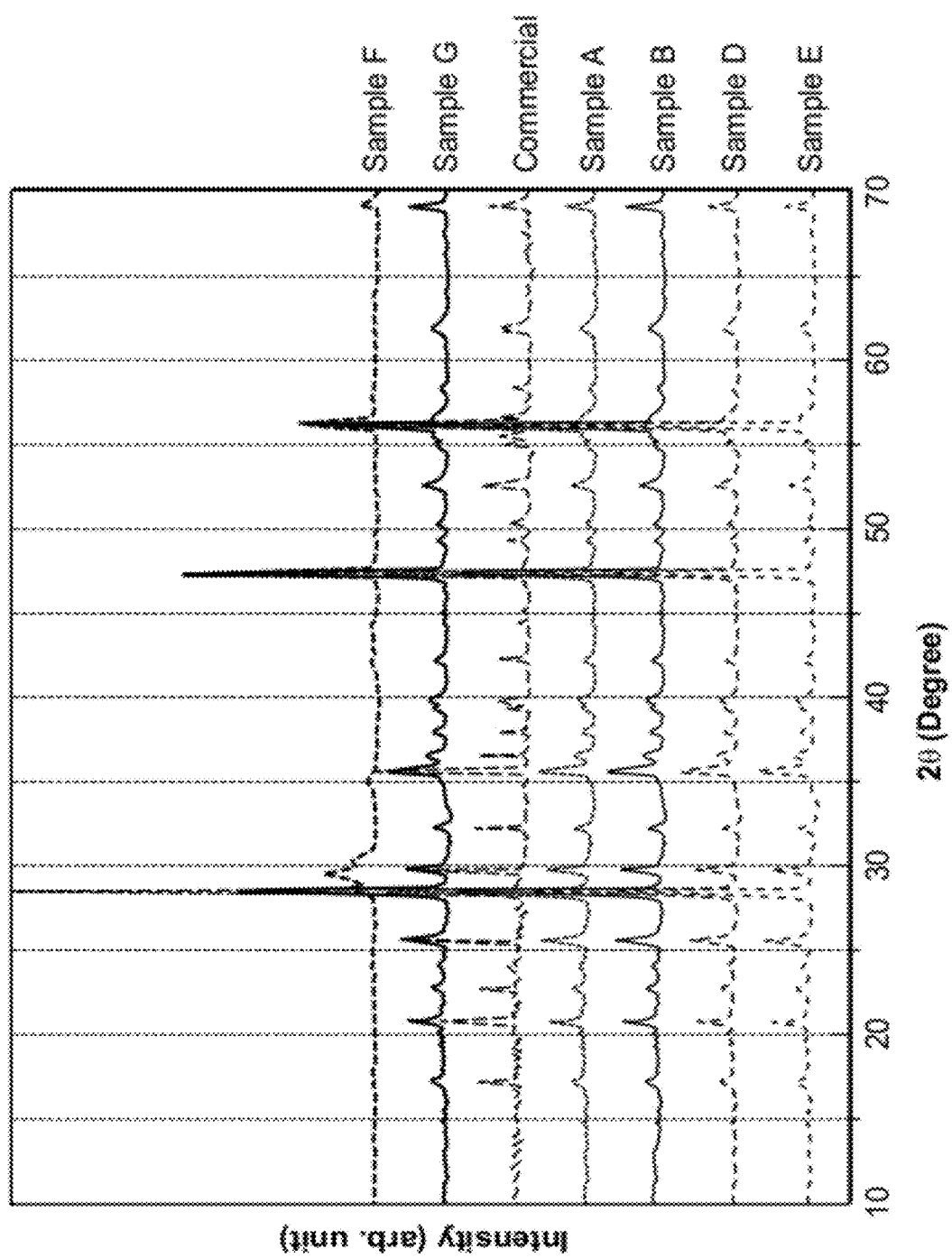
FIG. 17 shows X-ray diffraction patterns of samples A, B, D, E, F, G, and commercial LiFePO$_4$, each mixed with 50 wt % Si.

Two compositions, $Li_{0.5}FePO_4$ (sample F) and $FePO_4$ (sample G), were prepared using the same starting materials and procedures as for the samples described in Example 1. The BET surface areas and carbon contents were 42.86 $m^2/g$ and 22.96 $m^2/g$, and 4.00% and 4.68%, respectively. XRD of a 50:50 mixture by weight of Si and each sample (FIGS. 16-17) showed that the $Li_{0.5}FePO_4$ sample had broad olivine peaks that were still more reduced in intensity relative to the Si than the earlier described samples of higher Li content. The $FePO_4$ sample was different still; it had no easily discernable olivine peaks, only broad peaks, which also did not match the hexagonal $FePO_4$ phase. It is also noteworthy that none of the earlier shown XRD patterns, even those for Li deficient compositions, showed the hexagonal $FePO_4$ phase. Thus, the results indicate that the presence of lithium promotes crystallization of the olivine phase, but not the complete crystallization of the sample, and that in the absence of Li, different amorphous or nanocrystalline phases are formed.

The XRD results on sample G, $FePO_4$, which had BET surface area of 22.96 $m^2/g$ and carbon content of 4.68%, showed that even after firing to 600° C., this material had not crystallized the known crystalline phases of $FePO_4$, and was mostly amorphous (although the broad peaks also indicate possible nanocrystalline content). Thus, the sample had an electrochemically active, amorphous/disordered Fe—P—O—C phase. The results on the several other deliberately lithium-deficient $Li_{1-x}FePO_4$ compositions showed that such an amorphous phase (which also can be deduced to contain lithium based on the crystalline olivine fraction seen by XRD relative to the overall composition) was stable in the samples tested. Thus in nanoscale, high specific surface area and/or carbon containing compositions, an amorphous/disordered Li—Fe—P—O—C phase is stable.

Example 3

An undoped predominantly crystalline nanoscale LiFePO$_4$ powder was prepared using the method of Example 1, with final firing being carried out at 700° C. for 5 hours. The powder was found to have a BET specific surface area of 39.8 m$^2$/g, corresponding to an equivalent spherical particle size of 42 nm. Transmission electron microscopy ("TEM") showed the powder particles to be equiaxed, and TEM images and Rietveld refinement of X-ray diffraction data showed a crystallite size very similar to that inferred from the BET measurement.

The powder was formulated into electrodes and tested in Swagelok™ type cells of the type described in Example 1. The assembled cell was charged and discharged for one full cycle at C/5 rate to determine the electrode capacity, and then charged to 50% state-of-charge (SOC) at a C/10 rate. The cell was disassembled immediately, 0.5 mg of Si powder was placed on the surface of the electrode as a peak calibration standard, and X-ray diffraction was conducted. X-ray diffraction was then conducted again on the same electrode 48 hours after disassembly, and again 5 days after disassembly. Rietveld refinement was conducted on the X-ray diffraction patterns to obtain the lattice constants and amounts of the triphylite and heterosite phases in the electrode.

Figure 18:
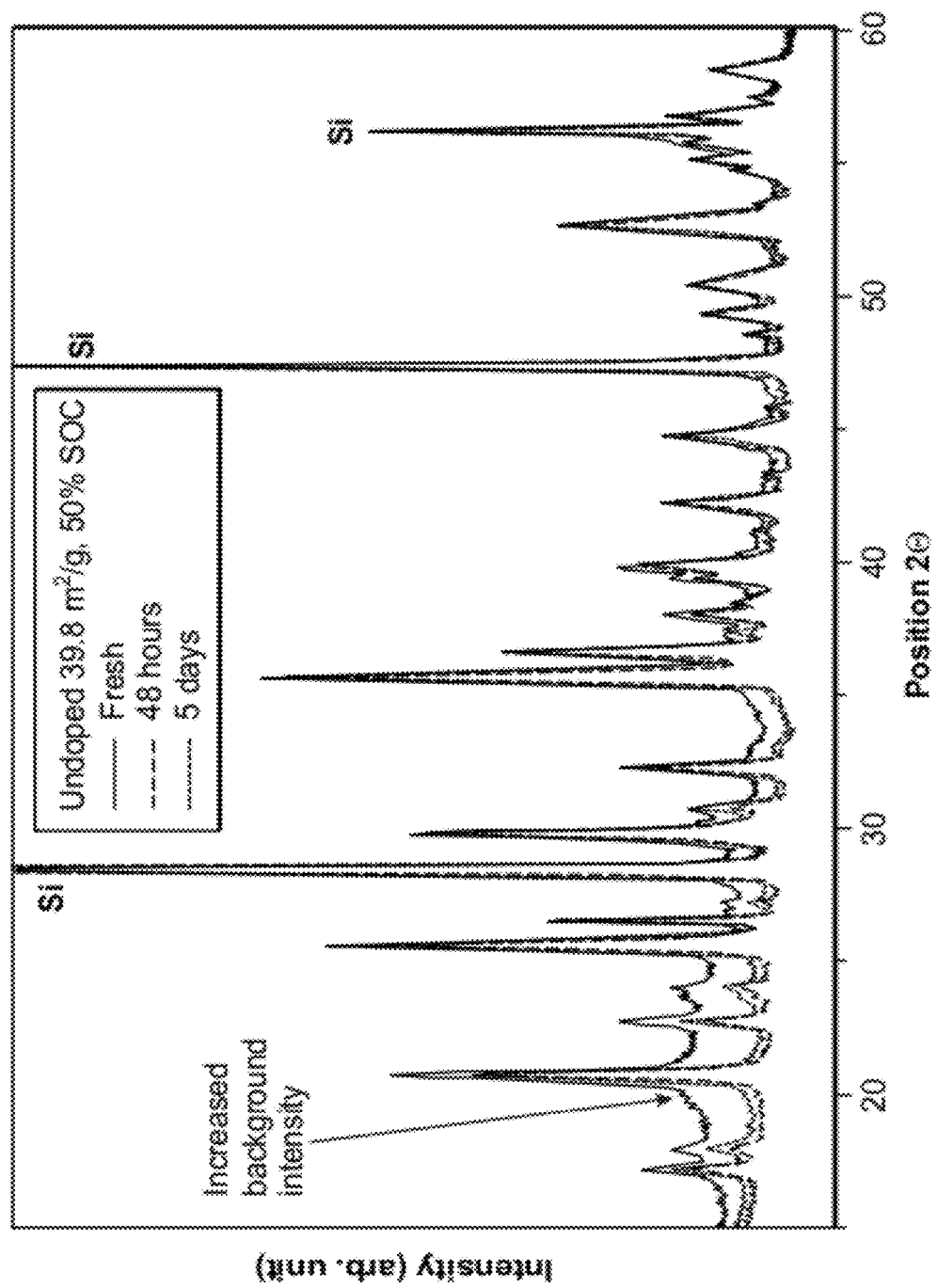
FIG. 18 shows X-ray diffraction patterns of a nanoscale LiFePO$_4$ powder having BET specific surface area of 39.8 m$^2$/g, which was formulated into an electrode in a Swagelok™ type lithium half-cell. The cell was charged to 50% state-of-charge (SOC) at a C/10 rate and immediately disassembled. X-ray diffraction patterns were obtained upon cell disassembly, and again 48 hours after disassembly, and 5 days after disassembly. Si powder placed on the surface of the electrode served as a peak calibration standard.

The X-ray diffraction patterns taken at the different elapsed times (FIG. 18) show an initial broad background in the 2θ angle range from 15° to 30°, which has diminished considerably by 48 hours and even more so after 5 days. This broad background is indicative of the presence of a newly created amorphous phase. Remarkably, the amount of the delithiated phase, heterosite, was initially very small, as shown in Table 3. With elapsed time intervals, the ratio of the phases, (weight fraction heterosite/weight fraction triphylite), systematically increased, from 0.059 to 0.251 to 0.323, but even after 5 days there was still a minority of the heterosite phase compared to that expected from the 50% SOC. This shows that the amorphous phase crystallizes over time at room temperature, and crystallizes a higher proportion of the heterosite (delithiated) phase. That is, the amorphous phase is rich in the heterosite composition. Aside from the crystallization of the amorphous phase, it is also possible that the charging process has produced equilibrium compositions of the triphylite phase. Namely, a solid solution forms that is more lithium deficient than the equilibrium composition, and as this phase evolves towards the equilibrium composition, more heterosite phase is formed.

Table 3 also shows the unit cell dimensions of the heterosite and triphylite phases at each elapsed time. It is seen that the difference in unit cell volume was initially smaller, and increased over time. A smaller lattice misfit means that any phase transformation occurring between heterosite and triphylite or vice versa can occur more easily; and the rate of charge and discharge of the battery relies on the rate of this phase transformation. (See, e.g., Meethong et al., "Strain accommodation during phase transformations in olivine-based cathodes as a materials selection criterion for high-power rechargeable batteries," *Adv. Functional Mater., In press* 2006; U.S. patent application Ser. No. 11/396,515, now U.S. Pat. No. 7,939,201.) Thus, it is seen that the charging (or discharging) process produces a material of smaller misfit and more facile phase transformation.

TABLE 3

Crystal Parameters for Undoped Nanoscale LiFePO$_4$ having 39.8 m$^2$/g Specific Surface Area at 50% SOC

| Compositional state | 39.8 m2/g, Fresh ~50% SOC | 39.8 m2/g, 48 hours ~50% SOC | 39.8 m2/g, 5 days ~50% SOC |
|---|---|---|---|
| Triphylite phase | | | |
| a (angstroms) | 10.3075 | 10.2998 | 10.2997 |
| b (angstroms) | 5.9969 | 5.9931 | 5.9945 |
| c (angstroms) | 4.7003 | 4.6979 | 4.698 |
| V (angstroms^3) | 290.5363 | 289.9946 | 290.0623 |
| Heterosite phase | | | |
| a (angstroms) | 9.855 | 9.828 | 9.834 |
| b (angstroms) | 5.815 | 5.811 | 5.807 |
| c (angstroms) | 4.785 | 4.792 | 4.785 |
| V (angstroms^3) | 274.2322 | 273.6869 | 273.2917 |
| Misfit (%) | | | |
| Volume strain | 5.774 | 5.786 | 5.954 |
| Phase ratio (wt %) | | | |
| Hetero/triphy | 0.059 | 0.251 | 0.323 |

This example shows that during use of a lithium rechargeable battery, the initially crystalline material was rendered amorphous in-situ, and remained at least partly amorphous over practical time scales of charge and discharge. For instance, in a hybrid electric vehicle application requiring high power, said active material would remain at least partly amorphous over the typical time scales that the battery is discharged for acceleration, or charged upon regenerative braking. Even for applications where the charge and discharge intervals are longer, such as the operation of a cellular telephone or a laptop computer, the time scale for crystallization of the amorphous phase is sufficiently long that the active material would remain substantially amorphous between intervals of charge or discharge.

Example 4

An undoped predominantly crystalline nanoscale LiFePO$_4$ powder was prepared using the method of Example 1, with final firing being carried out at 600° C. for 20 hours. The powder was found to have a BET specific surface area of 48.8 m$^2$/g, corresponding to an equivalent spherical particle size of 34 nm. TEM showed the powder particles to be equiaxed, and TEM images and Rietveld refinement of X-ray diffraction data showed a crystallite size very similar to that inferred from the BET measurement.

The powder was formulated into electrodes and tested in Swagelok™ type cells of the type described in Example 1. The assembled cell was charged and discharged for one full cycle at C/5 rate to determine the electrode capacity, and then charged to 50% state-of-charge (SOC) at a C/10 rate. The cell was disassembled immediately, and X-ray diffraction was conducted. X-ray diffraction was then conducted again on the same electrode 27 hours after disassembly, and again 6 days after disassembly. Rietveld refinement was conducted on the X-ray diffraction patterns to obtain the lattice constants and amounts of the triphylite and heterosite phases in the electrode.

Figure 19:
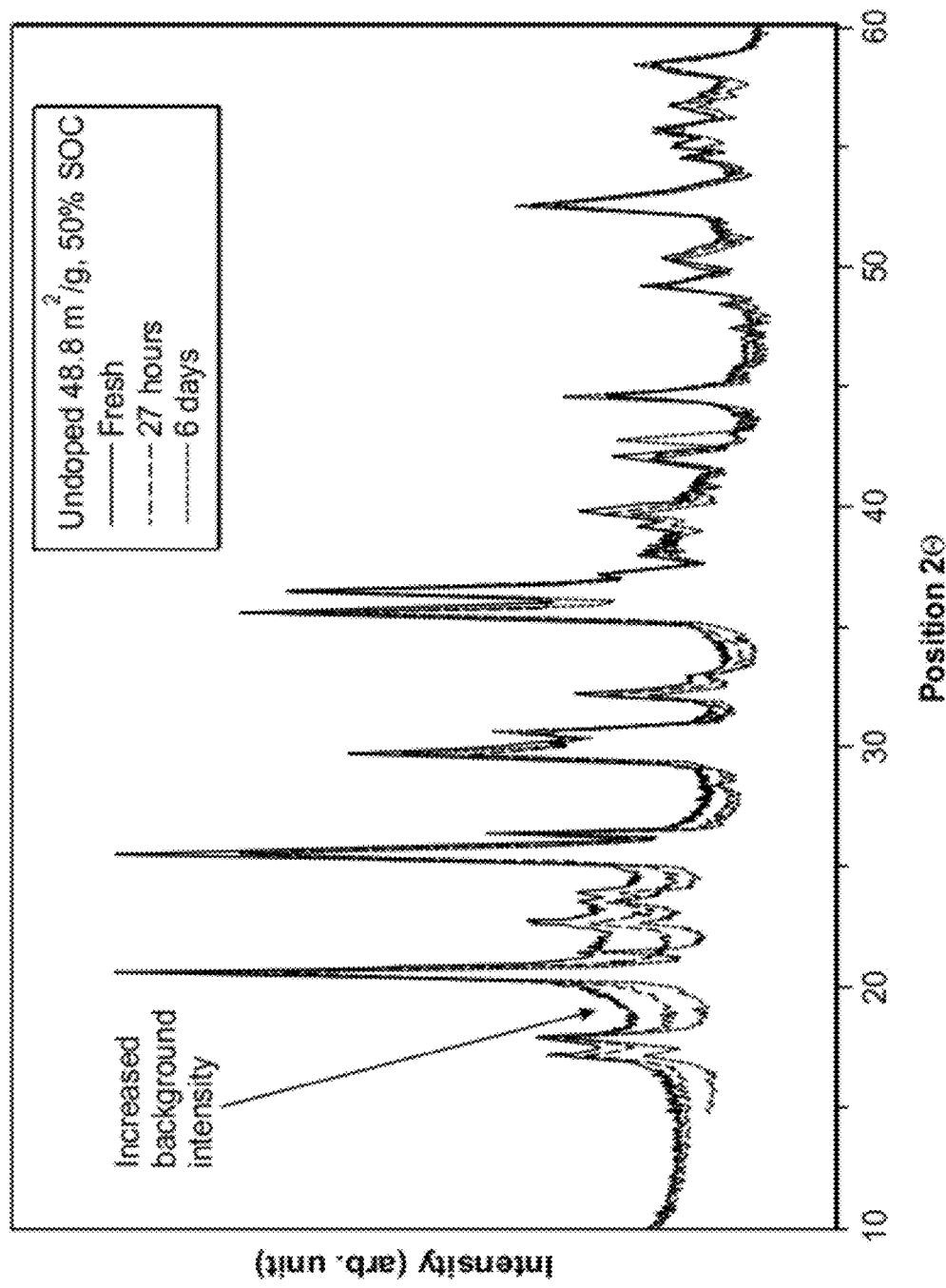
FIG. 19 shows X-ray diffraction patterns of a nanoscale LiFePO$_4$ powder having BET specific surface area of 48.8 m$^2$/g, which was formulated into an electrode in a Swagelok™ type lithium half-cell. The cell was charged to 50% state-of-charge (SOC) at a C/10 rate and immediately disassembled. X-ray diffraction patterns were obtained upon cell disassembly, and again 27 hours after disassembly, and 6 days after disassembly.

The X-ray diffraction patterns taken at the different elapsed times (FIG. 19), again show an initial broad background in the 2θ angle range from 15° to 30°, which has diminished considerably by 27 hours and even more so after, 6 days. This broad background is indicative of the presence of a newly created amorphous phase. At these elapsed time intervals, the ratio of the phases (weight fraction heterosite/weight fraction triphylite), systematically increased, from 0.437 to 0.527 to 0.910. This shows that the amorphous phase crystallizes over time at room temperature, and crystallizes a higher proportion of the heterosite (delithiated) phase. Aside from the crystallization of the amorphous phase, it is also possible that the charging process has produced equilibrium compositions of the triphylite phase. Namely, a solid solution forms that is more lithium deficient than the equilibrium composition, and as this phase evolves towards the equilibrium composition, more heterosite phase is formed.

Table 4 also shows the unit cell dimensions of the heterosite and triphylite phases at each elapsed time. It is seen that the difference in unit cell volume was initially smaller, and increased over time. A smaller lattice misfit means that any phase transformation occurring between heterosite and triphylite or vice versa can occur more easily; and the rate of charge and discharge of the battery relies on the rate of this phase transformation. (See, e.g., Meethong et al., "Strain accommodation during phase transformations in olivine-based cathodes as a materials selection criterion for high-power rechargeable batteries," *Adv. Functional Mater., In press* 2006; U.S. patent application Ser. No. 11/396,515, now U.S. Pat. No. 7,939,201.) Thus, it is seen that the charging (or discharging) process produces a material of smaller misfit and more facile phase transformation.

TABLE 4

Crystal Parameters for Undoped Nanoscale LiFePO$_4$ having 48.8 m$^2$/g Specific Surface Area at 50% SOC

| Compositional state | 48.8 m2/g, Fresh ~50% SOC | 48.8 m2/g, 27 hours ~50% SOC | 48.8 m2/g, 6 days ~50% SOC |
|---|---|---|---|
| Triphylite phase | | | |
| a (angstroms) | 10.266 | 10.263 | 10.272 |
| b (angstroms) | 5.9789 | 5.9783 | 5.9843 |
| c (angstroms) | 4.706 | 4.7079 | 4.7043 |
| V (angstroms^3) | 288.8542 | 288.8401 | 289.183 |
| Heterosite phase | | | |
| a (angstroms) | 9.86 | 9.853 | 9.842 |
| b (angstroms) | 5.829 | 5.8224 | 5.8116 |
| c (angstroms) | 4.7731 | 4.7757 | 4.7809 |
| V (angstroms^3) | 274.325 | 273.9855 | 273.4582 |
| Misfit (%) | | | |
| Volume strain | 5.160 | 5.279 | 5.590 |
| Phase ratio (wt %) | | | |
| Hetero/Triphyl | 0.437 | 0.527 | 0.91 |

Example 5

A predominantly crystalline nanoscale powder of composition Li$_{0.99}$Nb$_{0.01}$Mn$_{0.70}$Fe$_{0.30}$PO$_4$ was prepared using the method of Example 1, with Nb oxalate and Mn carbonate as additional starting materials. The powder was found to have a BET specific surface area of 40.2 m$^2$/g, and a carbon content of 2.44 wt %. Rietveld refinement of X-ray diffraction data showed a crystallite size very similar to that inferred from the BET measurement.

The powder was formulated into electrodes and tested in Swagelok™ type cells of the type described in Example 1. This powder provided a high capacity even at high discharge rates, with the specific capacity at rates of C/5, C, 2C, 5C, 10C and 20C being 143, 141, 138, 135, 134 and 130 mAh/g, respectively. Additional cells were then charged and discharged for one full cycle at C/5 rate to determine the electrode capacity, and then charged to various states-of-charge (SOC) at a C/10 rate. After charging to a desired SOC, the cell was disassembled, and X-ray diffraction was conducted within about 48 hours. Remarkably, it was found that the delithiated phase (corresponding to heterosite in the Fe-only endmember) did not form in detectable amounts until about 72% SOC. Even at 90% SOC, the ratio of the delithiated to lithiated phases (in wt %) was only 0.246, indicating that the majority of the delithiated material in the sample was not in the form of a crystallized form detectable by X-ray diffraction.

Figure 20:
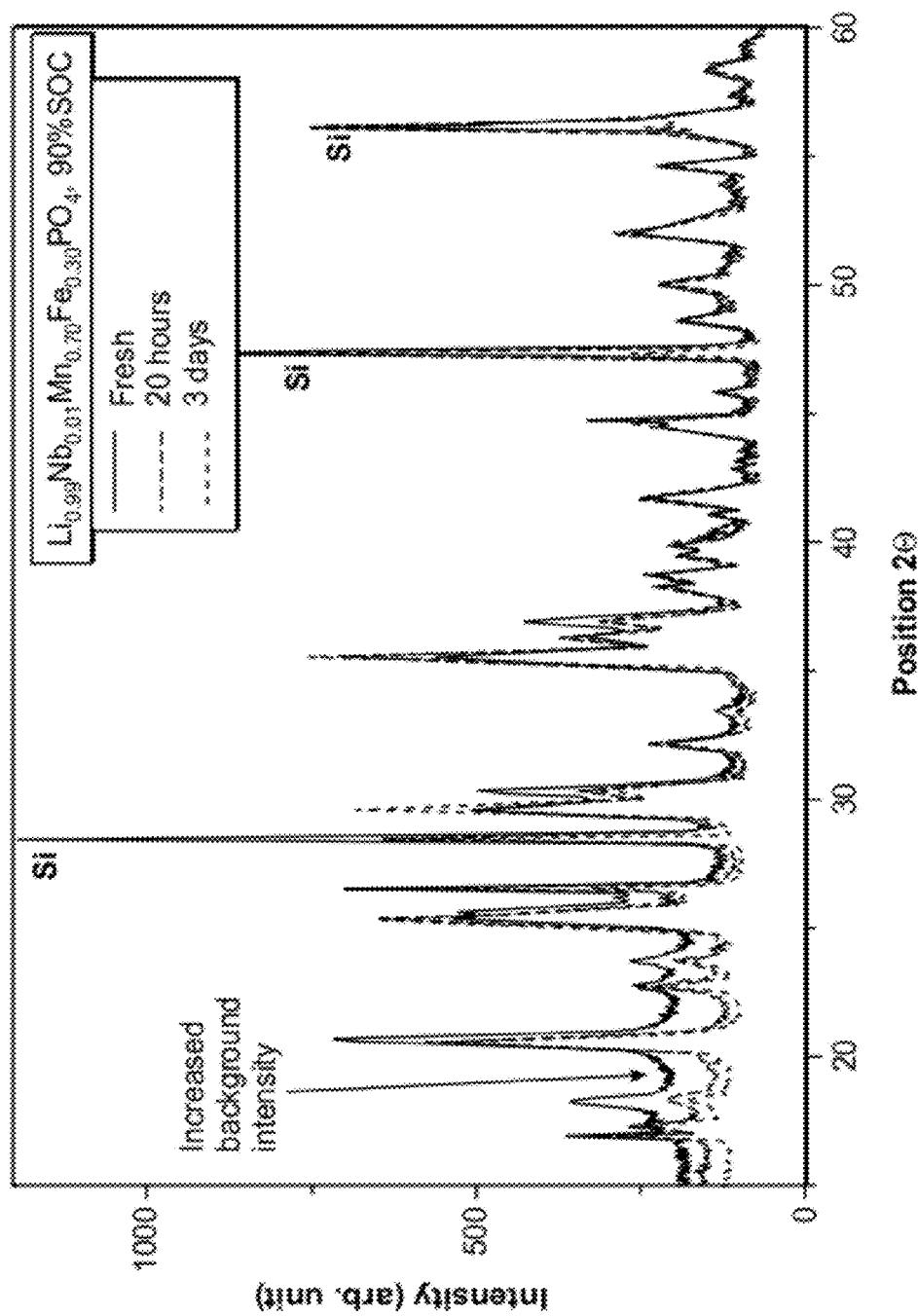
FIG. 20 shows X-ray diffraction patterns of a nanoscale Li$_{0.99}$Nb$_{0.01}$Mn$_{0.70}$Fe$_{0.30}$PO$_4$ powder having BET specific surface area of 40.2 m$^2$/g, which was formulated into an electrode in a Swagelok™ type lithium half-cell. The cell was charged to 90% state-of-charge (SOC) and immediately disassembled. X-ray diffraction patterns were obtained upon cell disassembly, and again 20 hours after disassembly, and 3 days after disassembly. Si powder applied to the face of the electrode was used as a diffraction peak reference.

A cell was then charged to 90% SOC and disassembled immediately, 0.5 mg of Si powder applied to the face of the electrode as a diffraction peak reference, and the electrode X-rayed. Then, the electrode was X-rayed again after 20 hours, and again after 3 days. FIG. 20 shows the X-ray diffraction patterns after each elapsed time. Rietveld refinement was conducted on the X-ray diffraction patterns to obtain the lattice constants and amounts of the lithiated and delithiated phases in the electrode. Again, there is an initial broad background in the 2θ angle range from 15° to 30°, which has diminished considerably by 20 hours and even more so after 3 days. This broad background is indicative of the presence of a newly created amorphous phase, which then crystallizes over many hours at room temperature. However, unlike the materials of Examples 3 and 4, with increasing elapsed time, the weight ratio of the delithiated to lithiated phases decreased remarkably, from 0.636 to 0.222 to 0.068, see Table 5. This shows that the amorphous material was Li-rich rather than Li-poor.

TABLE 5

Crystal Parameters for Nanoscale Li$_{0.99}$Nb$_{0.01}$Mn$_{0.70}$Fe$_{0.30}$PO$_4$ at 90% SOC

| Compositional state | Fresh ~90% SOC | 20 hours ~90% SOC | 3 Days ~90% SOC |
|---|---|---|---|
| Li(Mn, Fe)PO4 phase | | | |
| a (angstroms) | 10.264 | 10.2709 | 10.2672 |
| b (angstroms) | 6.0267 | 6.0281 | 6.0265 |
| c (angstroms) | 4.7767 | 4.781 | 4.7784 |
| V (angstroms^3) | 295.4773417 | 296.0108928 | 295.6611 |
| (Mn, FePO4) phase | | | |
| a (angstroms) | 9.705 | 9.692 | 9.682 |
| b (angstroms) | 5.893 | 5.881 | 5.893 |
| c (angstroms) | 4.788 | 4.793 | 4.788 |
| V (angstroms^3) | 273.8332132 | 273.194539 | 273.1918 |
| Phase ratio (wt %) | | | |
| MFP/LMFP | 0.636 | 0.222 | 0.068 |

From these results it is understood that within the general concept of creating amorphous phases from nanoscale crystalline materials by electrochemical charging or discharging, varying amounts of amorphous phase(s) can be produced in-situ by varying the initial composition and the particle size. Examples 3 and 4 show that the relative amounts of crystalline and amorphous material obtained upon electrochemical cycling are dependent on the particle size in the nanoscale regime (less than about 500 nm), as is the composition of the amorphous material and the relative amounts of the crystalline phases that may subsequently form from the amorphous material. Example 5 shows that this phenomenon (creation of an amorphous phase upon electrochemical cycling) also occurs for certain doped and mixed-transition-metal compositions. Following the methods exemplified herein, desired electrochemical performance of a particular electrode material, and resulting devices, can be obtained using techniques well-known to those skilled in the art without undue experimentation.

As will be apparent to one of skill in the art from a reading of this disclosure, the present invention can be embodied in forms other than those specifically disclosed above. The particular embodiments described above are, therefore, to be considered as illustrative and not restrictive. The scope of the invention is as set forth in the appended claims, rather than being limited to the examples contained in the foregoing description.

What is claimed is:

1. A compound having the formula $Li_aC_bM_cN_dX_eO_f$, wherein M is one or more first-row transition metals; N is an element from Groups IIA, IIIA, IVA, VA, VIA, IIB, IIIB or VIIB of the periodic table; X is one or more of P, Si, Ge, As, S; $0 \le a \le 1$; $0.001 \le b \le 0.10$; $0.8 \le c \le 1.2$; $0 \le d \le 0.10$; $0.9 \le e \le 2.2$; and $3.6 \le f \le 8.8$.

2. The compound of claim 1, wherein M includes at least one first row transition metal selected from the group consisting of Ti, V, Cr, Mn, Fe, Co and Ni.

3. The compound of claim 1, wherein M is Fe.

4. The compound of claim 1, wherein M includes Mn and Fe.

5. The compound of claim 1, wherein N is Nb and $0 < d \le 0.10$.

6. The compound of claim 1, wherein X is P.

7. The compound of claim 1, wherein the compound contains lithium at a concentration of at least about 5% by mole relative to the transition metal concentration.

8. The compound of claim 1, wherein the compound contains lithium at a concentration of at least about 10% by mole relative to the transition metal concentration.

9. The compound of claim 1, wherein the compound contains lithium at a concentration of no more than about 95% by mole relative to the transition metal concentration.

10. The compound of claim 1, wherein the compound contains lithium at a concentration of no more than about 85% by mole relative to the transition metal concentration.

11. A material comprising the compound of claim 1, wherein the material is at least partially amorphous.

12. A material comprising the compound of claim 1, wherein the material has a specific surface area of at least about 10 $m^2/g$.

13. A material comprising the compound f claim 1, wherein the material has a specific surface area of at least about 25 $m^2/g$.

14. A material comprising the compound of claim 1, wherein the material has a specific surface area of at least about 50 $m^2/g$.

15. A material comprising the compound of claim 1, wherein the material has a primary particle size with an average smallest cross-sectional dimension of about 200 nm or less.

16. A material comprising the compound of claim 1, wherein the material has a primary particle size with an average smallest cross-sectional dimension of about 100 nm or less.

17. A cathode comprising the compound of claim 1.

18. An electrochemical cell comprising the cathode of claim 17.

* * * * *